(12) United States Patent
Chae et al.

(10) Patent No.: US 10,153,890 B2
(45) Date of Patent: Dec. 11, 2018

(54) METHOD AND APPARATUS FOR TRANSMITTING AND RECEIVING SIGNAL OF DEVICE TO DEVICE TERMINAL IN WIRELESS COMMUNICATION SYSTEM

(71) Applicant: LG ELECTRONICS INC., Seoul (KR)

(72) Inventors: Hyukjin Chae, Seoul (KR); Hanbyul Seo, Seoul (KR); Youngtae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 9 days.

(21) Appl. No.: 15/318,645

(22) PCT Filed: Jun. 16, 2015

(86) PCT No.: PCT/KR2015/006081
§ 371 (c)(1),
(2) Date: Dec. 13, 2016

(87) PCT Pub. No.: WO2015/194830
PCT Pub. Date: Dec. 23, 2015

(65) Prior Publication Data
US 2017/0134146 A1    May 11, 2017

Related U.S. Application Data

(60) Provisional application No. 62/012,968, filed on Jun. 16, 2014, provisional application No. 62/017,246, (Continued)

(51) Int. Cl.
*H04L 5/00* (2006.01)
*H04W 72/04* (2009.01)
(Continued)

(52) U.S. Cl.
CPC .......... *H04L 5/0092* (2013.01); *H04L 5/0005* (2013.01); *H04L 5/0007* (2013.01);
(Continued)

(58) Field of Classification Search
CPC ... H04L 5/0092; H04L 5/0005; H04L 5/0007; H04W 72/044; H04W 92/18; H04W 8/005
See application file for complete search history.

(56) References Cited

U.S. PATENT DOCUMENTS 9,860,030 B2 *    1/2018  Papasakellariou .... H04W 48/12
2009/0274225 A1 * 11/2009  Khojastepour ...... H04B 7/0639
                                                          375/260
(Continued)

FOREIGN PATENT DOCUMENTS

WO    2015020448    2/2015
WO    2015081561    6/2015

OTHER PUBLICATIONS

European Patent Office Application Serial No. 15810049.5, Search Report dated Jan. 3, 2018, 9 pages.
(Continued)

*Primary Examiner* — Ajay Cattungal
(74) *Attorney, Agent, or Firm* — Lee Hong Degerman Kang Waimey

(57) ABSTRACT

A device to device (D2D) signal transmission method in which a D2D terminal transmits a D2D signal in a wireless communication system according to one embodiment of the present invention comprises the steps of: defining a time-frequency resource range in which the D2D signal is to be transmitted in a subframe; and transmitting the D2D signal through the defined time-frequency resource range, wherein the frequency resource range in which the D2D signal is to be transmitted in the subframe includes a first frequency
(Continued)

resource range and a second frequency resource range, positions of the first frequency resource range and the second frequency resource range are defined by an independent parameter, and dimensions of the first frequency resource range and the second frequency resource range are defined by a common parameter.

13 Claims, 14 Drawing Sheets

Related U.S. Application Data filed on Jun. 25, 2014, provisional application No. 62/021,675, filed on Jul. 7, 2014, provisional application No. 62/024,996, filed on Jul. 15, 2014, provisional application No. 62/033,637, filed on Aug. 5, 2014, provisional application No. 62/041,640, filed on Aug. 25, 2014.

(51) Int. Cl.
 *H04W 92/18* (2009.01)
 *H04W 8/00* (2009.01)

(52) U.S. Cl.
 CPC .......... *H04W 72/044* (2013.01); *H04W 8/005* (2013.01); *H04W 92/18* (2013.01)

(56) References Cited

U.S. PATENT DOCUMENTS

| | | | |
|---|---|---|---|
| 2010/0064185 A1* | 3/2010 | Zheng | H04L 1/06 714/704 |
| 2011/0032855 A1* | 2/2011 | Kim | H04L 5/0037 370/294 |
| 2011/0268006 A1 | 11/2011 | Koskela et al. | |
| 2011/0286541 A1* | 11/2011 | Chun | H04B 7/2656 375/260 |
| 2015/0085735 A1* | 3/2015 | Shelby | H04L 65/80 370/312 |

OTHER PUBLICATIONS

Samsung, "Details on frequency hopping for D2D data transmission", 3GPP TSG RAN WG1 Meeting #78bis, R1-144374, Oct. 2014, 4 pages.

Cea et al., "D2D physical channels and signals", 3GPP TSG RAN WG1 Meeting #77, R1-142295, May 2014, 5 pages.

Samsung, "Mode 2 resource allocation for D2D broadcast communication", 3GPP TSG RAN WG1 Meeting #77, R1-142111, May 2014, 6 pages.

Itri, "Discussion on Inter-Cell D2D Discovery", 3GPP TSG RAN WG2 Meeting #86, R2-142116, May 2014, 4 pages.

3rd Generation Partnership Project (3GPP), "Technical Specification Group Radio Access Network; Evolved Universal Terrestrial Radio Access (E-UTRA); Physical layer procedures (Release 12)," 3GPP TS 36.213 V12.1.0, Mar. 2014, 186 pages.

PCT International Application No. PCT/KR2015/006081, Written Opinion of the International Searching Authority dated Oct. 8, 2015, 15 pages.

Zte, "Resource Allocation for Type 1 Discovery", R1-142231, 3GPP TSG RAN WG1 Meeting #77, May 10, 2014, 5 pages.

Ericsson, "Transmission resource allocation control for D2D communication", R1-142399, 3GPP TSG RAN WG1 Meeting #77, May 9, 2014, 3 pages.

Sharp, "Physical Channel Design for D2D SA and Data Transmission", R1-142206, 3GPP TSG RAN WG1 Meeting #77, May 10, 2014, 6 pages.

LG Electronics, "Discussion on Signaling for D2D Communication Resource Allocation", R1-142147, 3GPP TSG RAN WG1 Meeting #77, May 10, 2014, 8 pages.

* cited by examiner

FIG. 17
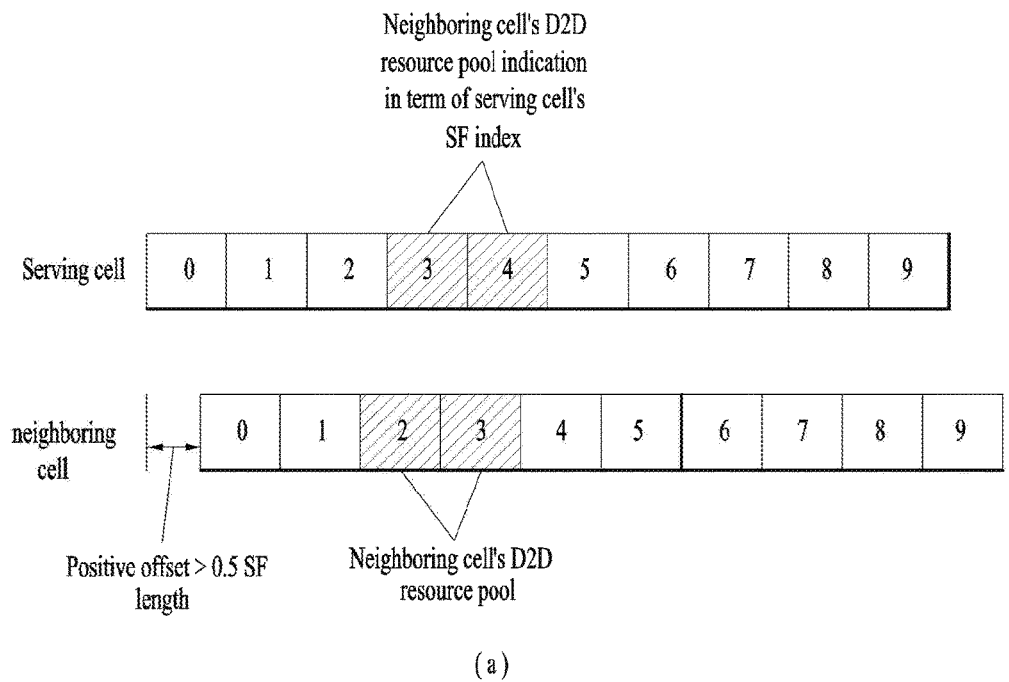
(a)
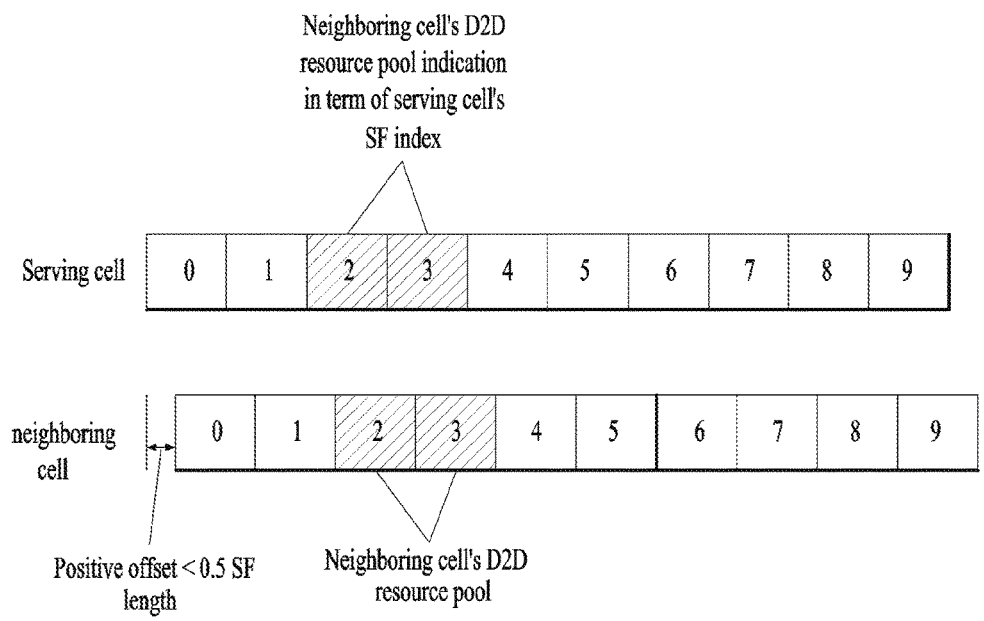

METHOD AND APPARATUS FOR TRANSMITTING AND RECEIVING SIGNAL OF DEVICE TO DEVICE TERMINAL IN WIRELESS COMMUNICATION SYSTEM

CROSS-REFERENCE TO RELATED APPLICATIONS

This application is the National Stage filing under 35 U.S.C. 371 of International Application No. PCT/KR2015/006081, filed on Jun. 16, 2015, which claims the benefit of U.S. Provisional Application Nos. 62/012,968, filed on Jun. 16, 2014, 62/017,246, filed on Jun. 25, 2014, 62/021,675, filed on Jul. 7, 2014, 62/024,996, filed on Jul. 15, 2014, 62/033,637, filed on Aug. 5, 2014 and 62/041,640, filed August. 25, 2014, the contents of which are all hereby incorporated by reference herein in their entirety.

TECHNICAL FIELD

The following description relates to a wireless communication system and, more particularly, to a signal transmission and reception method and apparatus for Device-to-Device (D2D) communication.

BACKGROUND ART

Wireless communication systems have been widely deployed to provide various types of communication services such as voice or data. In general, a wireless communication system is a multiple access system that supports communication of multiple users by sharing available system resources (a bandwidth, transmit power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

D2D communication is a communication scheme in which a direct link is established between User Equipments (UEs) and the UEs exchange voice and data directly with each other without intervention of an evolved Node B (eNB). D2D communication may cover UE-to-UE communication and peer-to-peer communication. In addition, D2D communication may find its applications in Machine-to-Machine (M2M) communication and Machine Type Communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, the overhead of a network may be reduced. Further, it is expected that the introduction of D2D communication will reduce the power consumption of devices participating in D2D communication, increase data transmission rates, increase the accommodation capability of a network, distribute load, and extend cell coverage.

DETAILED DESCRIPTION OF THE INVENTION

Technical Problems

An object of the present invention is to provide a resource configuration for signal transmission in D2D communication and signaling therefor.

The technical objects that can be achieved through the present invention are not limited to what has been particularly described hereinabove and other technical objects not described herein will be more clearly understood by persons skilled in the art from the following detailed description.

Technical Solutions

In an aspect of the present invention, provided herein is a method of transmitting a Device-to-Device (D2D) signal by a D2D User Equipment (UE) in a wireless communication system, including determining a time-frequency resource region in which the D2D signal is to be transmitted in a subframe and transmitting the D2D signal through the determined time-frequency resource region, wherein the frequency resource region in the subframe in which the D2D signal is to be transmitted includes a first frequency resource region and a second frequency resource region, positions of the first frequency resource region and the second frequency resource region are determined by independent parameters, and sizes of the first frequency resource region and the second frequency resource regions are determined by a common parameter.

In another aspect of the present invention, provided herein is a Device-to-Device (D2D) User Equipment (UE) in a wireless communication system, including a reception module and a processor, wherein the processor determines a time-frequency resource region in which a D2D signal is to be transmitted in a subframe and transmits the D2D signal through the determined time-frequency resource region, the frequency resource region in the subframe in which the D2D signal is to be transmitted includes a first frequency resource region and a second frequency resource region, positions of the first frequency resource region and the second frequency resource region are determined by independent parameters, and sizes of the first frequency resource region and the second frequency resource regions are determined by a common parameter.

The independent parameters may be a start Physical Resource Block (PRB) index and an end PRB index and the common parameter may be the number of PRBs.

A PRB having an index equal to or greater than the start PRB index and less than (start PRB index+number of PRBs) may be included in the first frequency resource region and a PRB having an index greater than (end PRB index−number of PRBs) and less than the end PRB index may be included in the second frequency region.

The start PRB index, the end PRB index, and the number of PRBs may be received through higher layer signaling.

The D2D signal may be a discovery signal.

The time-frequency resource region may be used during a maximum of 1024 radio frames.

A maximum period of a configuration for the time-frequency resource region may be 1024 radio frames.

The D2D signal may be a D2D data signal.

D2D transmission mode 2 may be configured for the UE.

The D2D signal may be a D2D control signal.

The method may further include receiving an indication regarding a resource position of a neighbor cell.

The UE may assume that a time-frequency resource region in which a D2D signal of the neighbor cell is to be transmitted is present within a predetermined window based on an indicated timing.

Advantageous Effects

A resource configuration and signaling method according to an embodiment of the present invention can obtain gain in terms of all of signaling overhead, frequency diversity, and fairness of resource allocation.

The effects that can be achieved through the present invention are not limited to what has been particularly described hereinabove and other effects not described herein will be more clearly understood by persons skilled in the art from the following detailed description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIGS. 12 to 17 are diagrams illustrating signaling of a time resource region, reception of a synchronization signal of a neighbor cell, and acquisition of configuration of resources of a neighbor cell therethrough;

BEST MODE FOR CARRYING OUT THE INVENTION

Figure 1:
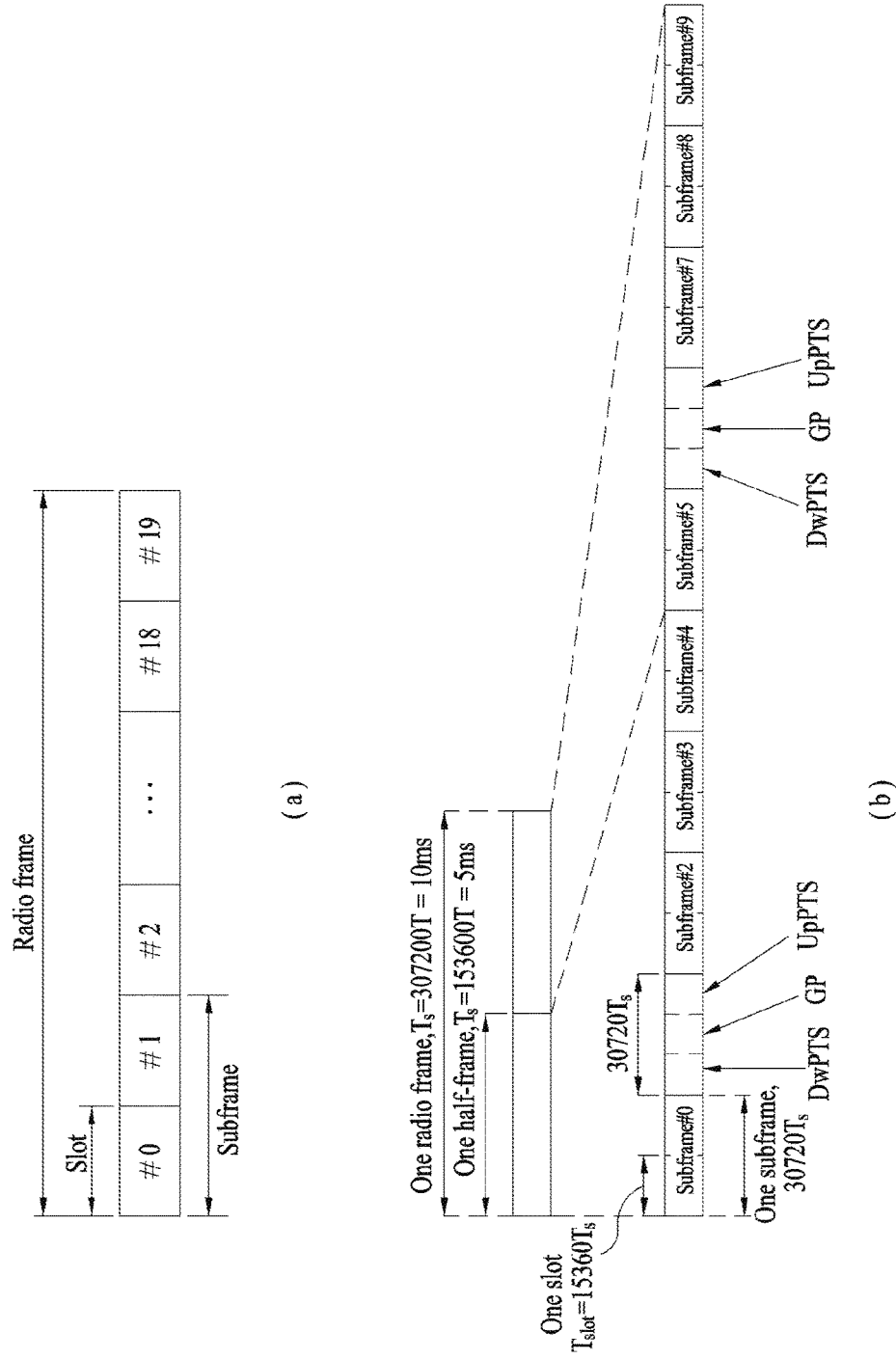
FIG. 1 is a diagram illustrating the structure of a radio frame.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc. In addition, in the following embodiments, the term "base station" may mean an apparatus such as a scheduling node or a cluster header. If the base station or the relay transmits a signal transmitted by a terminal, the base station or the relay may be regarded as a terminal.

The term "cell" may be understood as a base station (BS or eNB), a sector, a Remote Radio Head (RRH), a relay, etc. and may be a comprehensive term referring to any object capable of identifying a component carrier (CC) at a specific transmission/reception (Tx/Rx) point.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

LTE/LTE-A resource structure/channel

With reference to FIG. 1, the structure of a radio frame will be described below.

In a cellular Orthogonal Frequency Division Multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus, when the extended CP is used, for example, 6 OFDM symbols may be included in one slot. If channel state gets pool, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
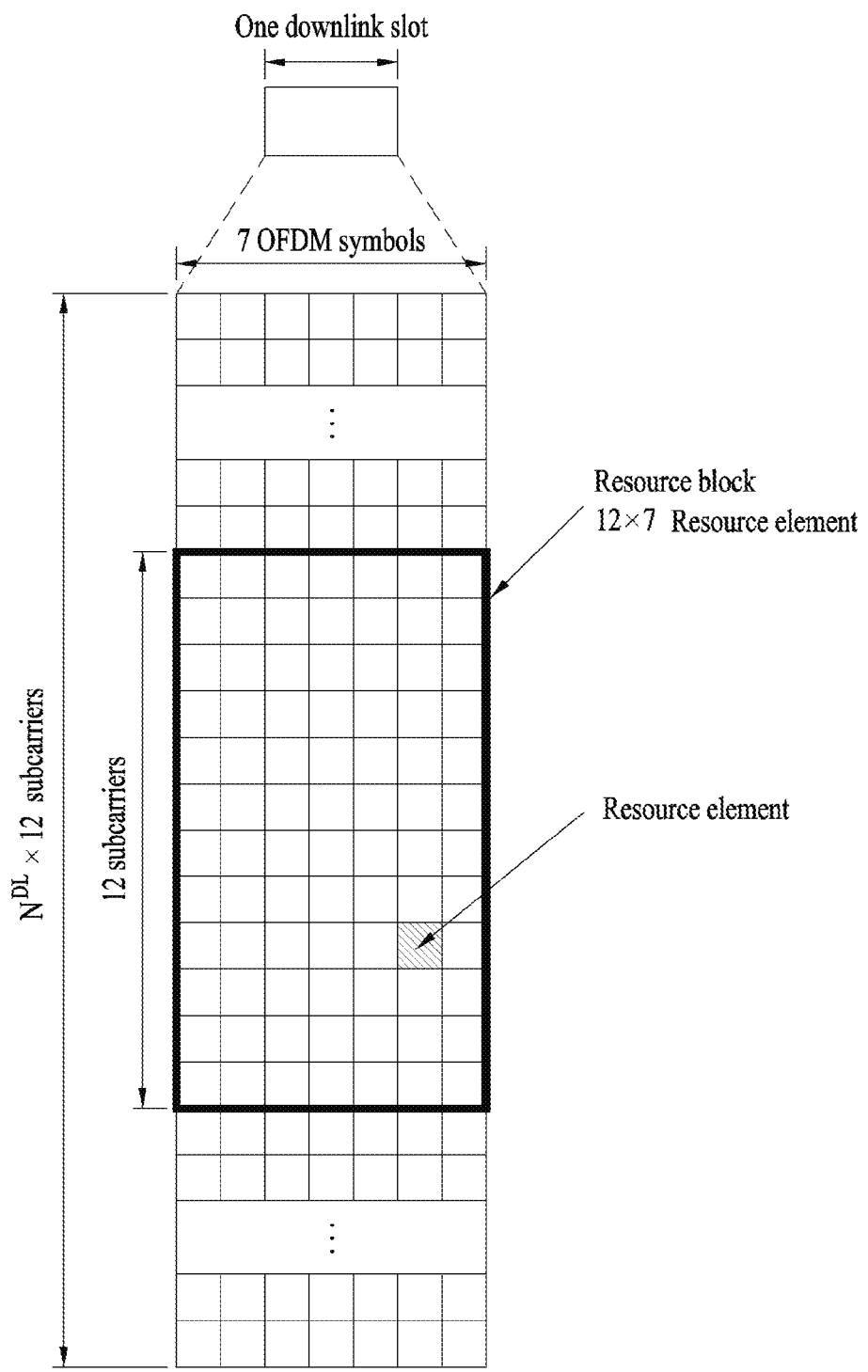
FIG. 2 is a diagram illustrating a resource grid for one downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 3:
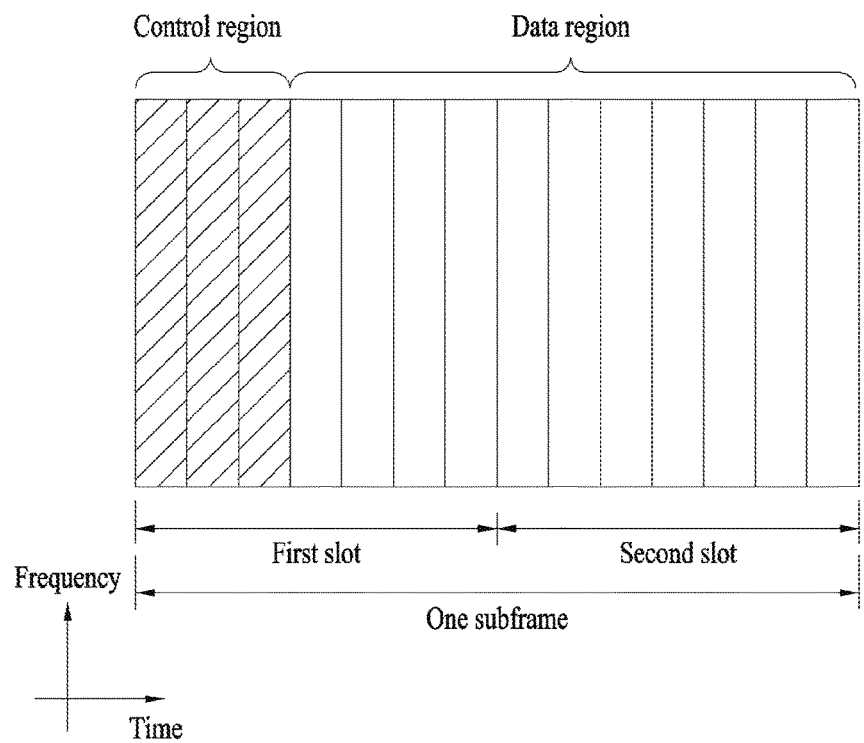
FIG. 3 is a diagram illustrating the structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmit power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmit power control commands for individual UEs of a UE group, transmit power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
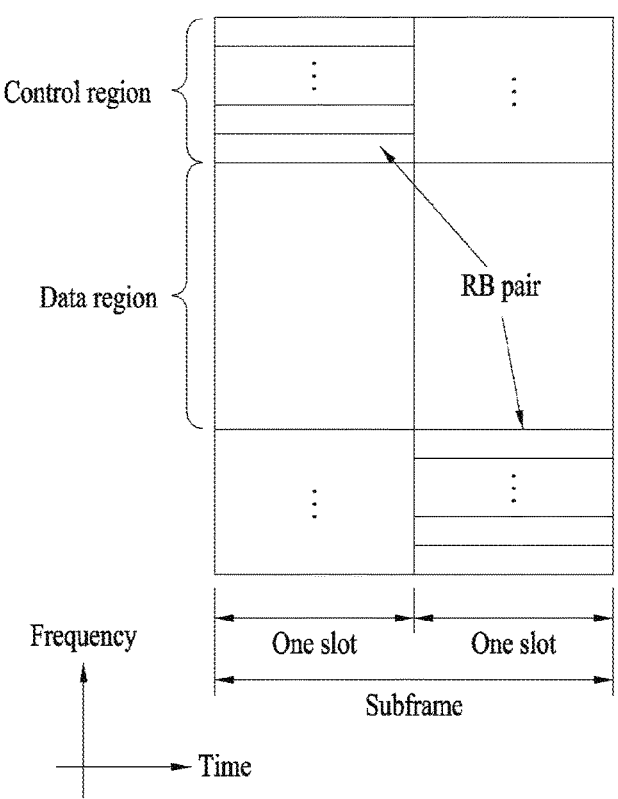
FIG. 4 is a diagram illustrating the structure of an uplink subframe.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Synchronization Acquisition of D2D UEs

Hereinafter, a description will be given of synchronization acquisition of UEs in D2D communication, based on the foregoing description and the legacy LTE/LTE-A system. In an OFDM system, if time/frequency synchronization is not established, it may be impossible to multiplex different UEs in an OFDM signal due to inter-cell interference. It is inefficient for all D2D UEs to individually establish synchronization by directly transmitting and receiving synchronization signals. Therefore, in a distributed node system such as a D2D communication system, a specific node may transmit a representative synchronization signal and the other UEs may establish synchronization with the representative synchronization signal. In other words, for D2D signal transmission and reception, some nodes (which may be referred to as eNBs, UEs, Synchronization Reference Nodes (SRNs) (or called synchronization sources)) may periodically transmit a D2D Synchronization Signal (D2DSS) and the other UEs may transmit and receive signals in synchronization with the D2DSS.

The transmission period of the D2DSS is not shorter than 40 ms and one or more symbols may be used in a subframe for D2DSS transmission.

The D2DSS may be categorized into a Primary D2DSS (PD2DSS) (or a Primary Sidelink Synchronization Signal (PSSS)) and a Secondary D2DSS (SD2DSS) (or Secondary Sidelink Synchronization Signal (SSSS)). The PD2DSS may be configured to have a similar/modified/repeated structure of a Zadoff-Chu sequence having a predetermined length or a Primary Synchronization Signal (PSS). The SD2DSS may be configured to have a similar/modified/repeated structure of an M-sequence or a Secondary Synchronization Signal SSS.

A D2D UE should select a D2D synchronization source based on the same priority criterion. In an out-of-coverage situation, if strengths of all D2DSSs received by the UE are equal to or less than a preset value, the UE may become a synchronization source. In an in-coverage situation, the UE may be configured as the synchronization source by an eNB. If UEs are synchronized with the eNB, the eNB may be the synchronization source and the D2DSS may be a PSS/SSS. A D2DSS of a synchronization source derived from the eNB may be different from a D2DSS of a synchronization source which is not derived from the eNB.

A Physical D2D Synchronization Channel (PD2DSCH) may be a (broadcast) channel over which basic (system) information (e.g., information related to the D2DSS, a Duplex Mode (DM), TDD UL/DL configuration, information related to a resource pool, a type of an application related to the D2DSS, etc.) that the UE should first obtain before transmitting and receiving a D2DSS is transmitted. The PD2DSCH may be transmitted in the same subframe as a subframe in which the D2DSS is transmitted or in a subframe following the subframe in which the D2DSS is transmitted.

The D2DSS may be a specific sequence and the PD2DSCH may be a sequence indicating specific information or a codeword obtained through predetermined channel coding. Herein, the SRN may be an eNB or a specific D2D UE. In the case of partial network coverage or out-of-network coverage, a UE may be the SRN.

Figure 5:
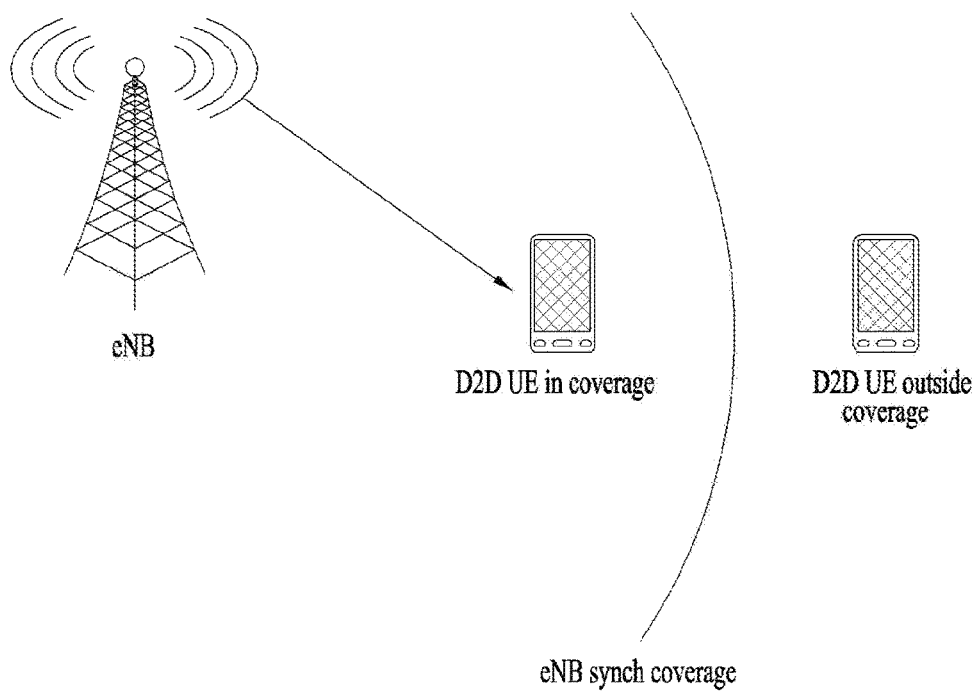
FIG. 5 is a diagram illustrating relay of a synchronization signal.

In a situation as illustrated in FIG. 5, a D2DSS may be relayed for D2D communication with an out-of-coverage UE. The D2DSS may be relayed over multiple hops. In the following description, relaying a synchronization signal means not only direct Amplify-and-Forward (AF) relay of the synchronization signal transmitted by an eNB but also transmission of a D2DSS of a separate format at a reception time of the synchronization signal. As the D2DSS is relayed in this way, an in-coverage UE and an out-of-coverage UE may perform direct communication with each other.

Figure 6:
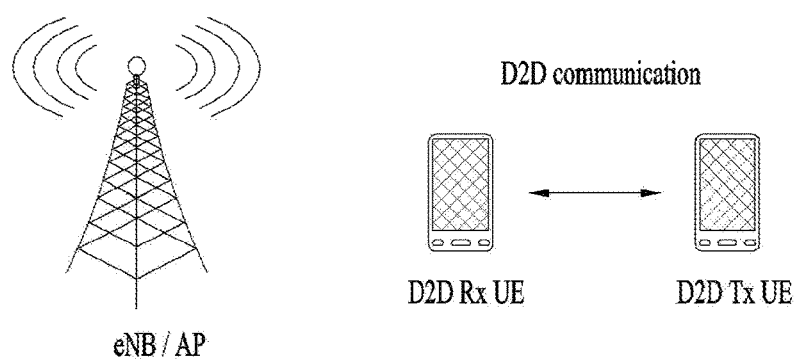
FIG. 6 is a diagram illustrating a communication environment to which an embodiment of the present invention is applicable.

FIG. 6 illustrates an exemplary situation in which a D2D UE 610 (도면에는 참조번호가 없습니다) receives signals from a relay UE 620 and a D2D UE 610 (??). In this case, the D2D UE needs to distinguish a signal transmitted by the relay UE and a signal transmitted by the D2D UE. If the relay UE allows an out-of-coverage UE to access a network for the purpose of Public Safety (PS), the signal from the relay UE needs to be distinguished from a typical D2D signal. Although not shown in the figure, it may also be necessary to identify whether the signal received by the D2D UE is a signal transmitted by a PS UE or a signal transmitted by a Non-PS (NPS) UE. Hereinafter, a description will be given of a method for a D2D UE receiving a signal to determine whether the received signal is from a relay UE or a typical D2D UE (or from a PS UE or an NPS UE). The following description expressed as distinguishing between the relay UE and the typical D2D UE for convenience of description may be applied to a method of distinguishing between the PS UE and the NPS UE.

Hereinafter, a description will be given of a method of determining a D2D time and/or frequency resource pool, a method of signaling the same, and methods of receiving a D2DSS in relation to a neighbor cell and determining a D2D resource of the neighbor cell, based on the above description. The following description relates to an apparatus/D2D UE performing D2D communication as illustrated in FIG. 6. If an eNB or an Access Point (AP) transmits a signal in the form of a D2D signal, the eNB or the AP may also be regarded as the apparatus/D2D UE performing D2D communication. In relation to D2D signal transmission and reception, D2D transmission/communication mode 1 may represent a method in which the eNB directly designates a position of a transmission resource to perform D2D communication and D2D transmission/communication mode 2 may represent a method in which a pool of resources is designated by the eNB or pre-designated and the UE selects a specific resource from the pool to transmit a D2D communication packet. In addition, discovery type 1 may represent a method in which the eNB designates a pool of resources and the UE selects a specific resource from the pool to transmit a discovery signal. Discovery type 2 may represent a method in which the eNB directly indicates a position of a resource on which the UE transmits the discovery signal. The following description may be mainly applied to mode 2 and discovery type 1 but embodiments of the present invention are not limited thereto. A method proposed below may also be applied to a pool in which a D2D control signal (e.g., Scheduling Assignment (SA) or a D2DSS) is transmitted. Herein, the SA may represent a signal through which a D2D control signal is transmitted and may include information indicating a position where D2D data is transmitted and a transmission format of the D2D data. Hereinafter, a description will be given of a method of configuring a D2D resource pool regardless of a type of the D2D signal. Different methods of configuring a pool may be used with respect to different types of D2D signals.

In the following description, a resource pool may be signaled by one of RRC, an SIB, and a (UE-specific or UE-common) PDCCH/EPDCCH. Alternatively, a set of resource pools may be pre-signaled through RRC and a D2D resource pool to be applied in a specific subframe or a specific radio frame or for a predetermined period (e.g. 40 ms) may be signaled through the (E)PDCCH.

Determination of Frequency Resource Pool and Signaling Therefor

A D2D UE may determine a time-frequency resource region in which the D2D UE is to transmit a D2D signal in a subframe and transmit the D2D signal in the determined time-frequency resource region. Herein, the time resource region, i.e., a subframe in which the D2D signal is transmitted, may be determined using the method invented by the inventors of the present invention and disclosed in Patent Application No. PCT/KR2015/003534. In addition, the frequency resource region, i.e., PRB(s) in which the D2D signal is transmitted in the subframe for D2D transmission, may be determined by parameters (RB indexes of start and end points and one parameter for the size of the resource region) indicated through higher layer signaling.

More specifically, the frequency resource region in the subframe in which the D2D signal will be transmitted may include a first frequency resource region and a second frequency resource region. The positions of the first frequency resource region and the second frequency resource region may be determined by independent parameters and the sizes of the first frequency resource region and the second frequency resource region may be determined by a common parameter. If the two frequency resource regions have the same size (determined by the common parameter), gain may be obtained in terms of signaling overhead, frequency diversity, and fairness of resource allocation by determining the positions of the first frequency resource region and the second frequency resource region by the independent parameters. More specifically, if only one frequency resource region is determined in consideration only of signaling overhead, diversity gain cannot be obtained at all. If both the positions and sizes of the two frequency resource regions are determined by the common parameter, gain of signaling overhead may be obtained but diversity gain may be unequal between UEs when resources are allocated to multiple UEs.

The independent parameters may be Start PRB index, which is an RB index of a start point, and End PRB index, which is an RB index of an end point. The common parameter may be the number of PRBs indicating the size of a resource region. In this case, among PRB indexes, PRBs having indexes higher than or equal to Start PRB index and lower than Start PRB index+the number of PRBs may be included in the first frequency resource region and PRBs having indexes higher than End PRB index−the number of PRBs and lower than End PRB index may be included in the second frequency resource region.

The D2D signal transmitted on resources determined using the above-described method may be a D2D data signal transmitted over a Physical Sidelink Shared Channel (PSSCH), a discovery signal transmitted over a Physical Sidelink Discovery Channel (PSDCH), or a D2D control signal transmitted over a Physical Sidelink Control Channel (PSCCH).

In this way, if the frequency region of the D2D signal is divided into two regions and resources are allocated to the divided regions, cellular signal transmission resources may be prevented from being fragmented. In particular, an LTE UL signal uses an SC-FDMA modulation scheme in which a Peak-to-Average Power Ratio (PAPR) is lowered only when D2D resources are continuously allocated in the frequency regions. If D2D resource regions are discontinuously allocated in the frequency regions and are allocated to both ends of system bandwidth, cellular resources may use continuous middle frequency regions and thus fragmentation of the frequency regions of the cellular resources is prevented.

Hereinafter, a description will be given of frequency resources for D2D signal transmission according to another embodiment of the present invention. The description will be given in terms of signaling of information for determining frequency resources according to granularity of a frequency resource pool.

1) RB Unit

A basic unit of a frequency resource pool may be an RB and the frequency resource pool may be signaled in units of RBs. For example, if 50 PRBs (10 MHz) are present in a system and 3 RBs in each band edge are used for a PUCCH, 44 PUSCH PRBs may be present and may be signaled by a 44-bit bitmap. In this case, a bitmap of a frequency region may be signaled by representing the entire frequency bandwidth of the system or may be signaled by excluding a PUCCH region. According to an embodiment, when the entire frequency bandwidth of the system is represented, 50 bits are used to signal the frequency resource pool. If the frequency resource pool is signaled in units of RBs but a unit size of an actually transmitted D2D signal is configured by several RBs, a method of indexing D2D resources in the resource pool should be determined. In this case, one of methods illustrated in FIGS. 7(a) to 7(d) may be used.

Figure 7:
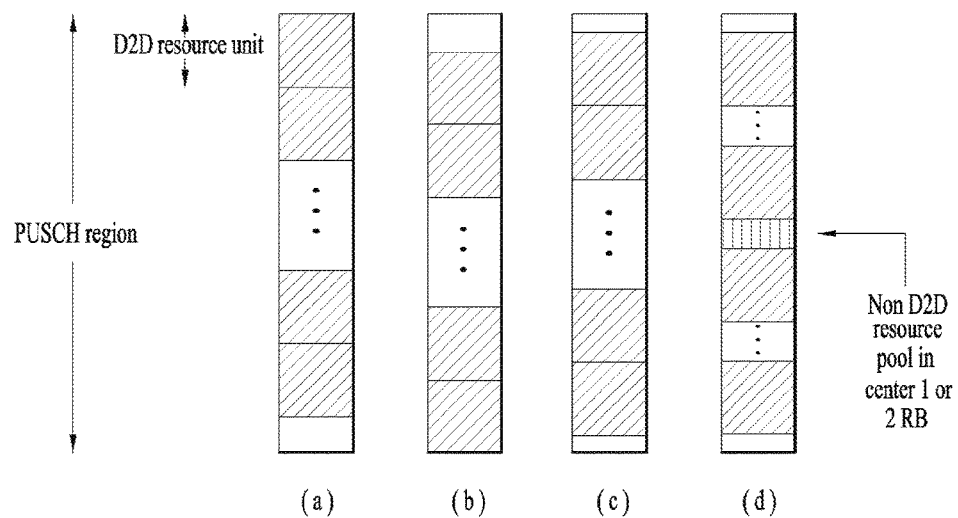
FIGS. 7 to 11 are diagrams illustrating configuration and signaling of a frequency resource region according to an embodiment of the present invention.

FIG. 7(a) illustrates a method of determining D2D resource indexes in order of a low frequency resource index. If a frequency resource pool of $\{0, \ldots, N-1\}$ arranged in order of an RB is present and one D2D signal is configured by M RBs, indexing may be performed in the manner of D2D resource index $0=\{0, \ldots, M-1\}$, $1=\{M, \ldots, 2*M-1\}$, $\ldots$, floor(N/M)$-1=\{M*$(floor(N/M)$-1)\}, \ldots, M*$floor$\{N/M\}-1\}$. As illustrated in the figure, the last few RBs of the resource pool may not be used.

FIG. 7(b) illustrates a method of allocating frequency resources to higher frequency resource indexes. Unlike FIG. 7(a), a few RBs having low indexes in the frequency resource pool may not be used.

FIG. 7(c) illustrates a method of aligning D2D resources as close to the center of the frequency resource pool as possible. For example, a center PRB index in the resource pool may be aligned to be used by a center index of the D2D resources. According to this method, in-band emission to a PUCCH or PUSCH may be attenuated.

Figure 8:
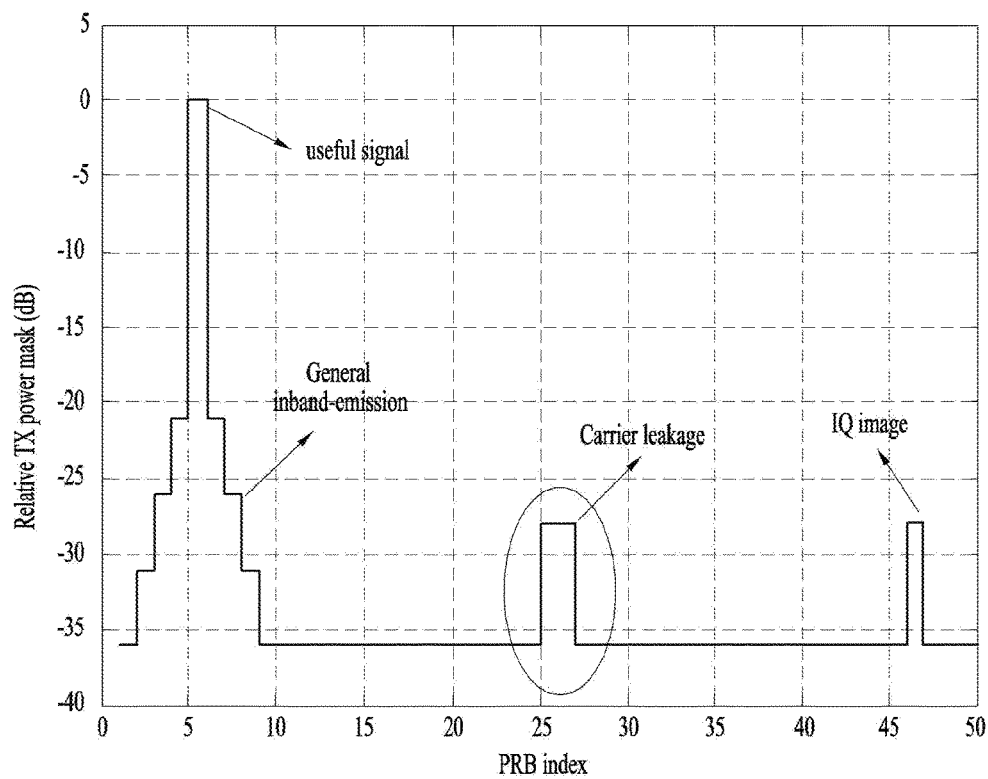

FIG. 7(d) illustrates a method of not using up to M−1 frequency regions for D2D resources when N mod M is not 0. Herein, N is the number of RBs in the frequency domain and M is an RB size of a region occupied by one D2D signal in the frequency domain. Although the first few RBs, the last few RBs, or both the first few and the last few RBs may not be used as a D2D pool, the center RBs may not be used as the D2D pool. When in-band emission is considered, the center RBs are subjected to stronger interference than the other regions due to carrier leakage as illustrated in FIG. 8. If multiple UEs transmit D2D signals simultaneously, the center RBs are likely to be subjected to strong interference because carrier leakages of the multiple UEs overlap. Therefore, the center RBs may be excluded when a resource pool is configured. For example, the D2D resource pool may be indicated in order of an RB having a low frequency index except the center RBs.

2) Unit of D2D Signal Unit Size

When a D2D resource pool is indicated, granularity of the resource pool may be signaled in units of a D2D signal unit size. If a D2D resource unit is configured by a plurality of PRB sizes (or a plurality of subframes) rather than one PRB, a bitmap of the D2D resource unit may be signaled. For example, if a discovery signal unit is configured by 2 PRB pairs, the frequency resource pool may be represented by a bitmap in units of 2 PRBs. When some of 50 PRBs in the frequency domain are used to indicate the D2D resource pool, a bitmap in units of PRBs needs 50 bits but a bitmap in the D2D resource unit needs only 25 bits and thus the number of bits signaled is reduced.

Alternatively, when the D2D resource pool is indicated, granularity of the resource pool may be signaled in units of a multiple of the D2D signal unit size (e.g., p times the D2D signal unit size). Herein, the value of p may be determined depending on system bandwidth.

If there are various unit sizes for a D2D signal transmitted in one resource pool, a unit having the smallest unit size (or the largest unit size, or an intermediate or average unit size) may be used as a resource pool indication granularity. If PRB sizes of a MAC PDU of the D2D signal are three types of 2, 3 and 4, the D2D resource pool is signaled in units of 2 PRBs. For example, when some of 50 PRB pairs in the frequency domain are signaled to indicate the D2D resource pool using a bitmap, a 25-bit bitmap may be signaled.

Figure 9:
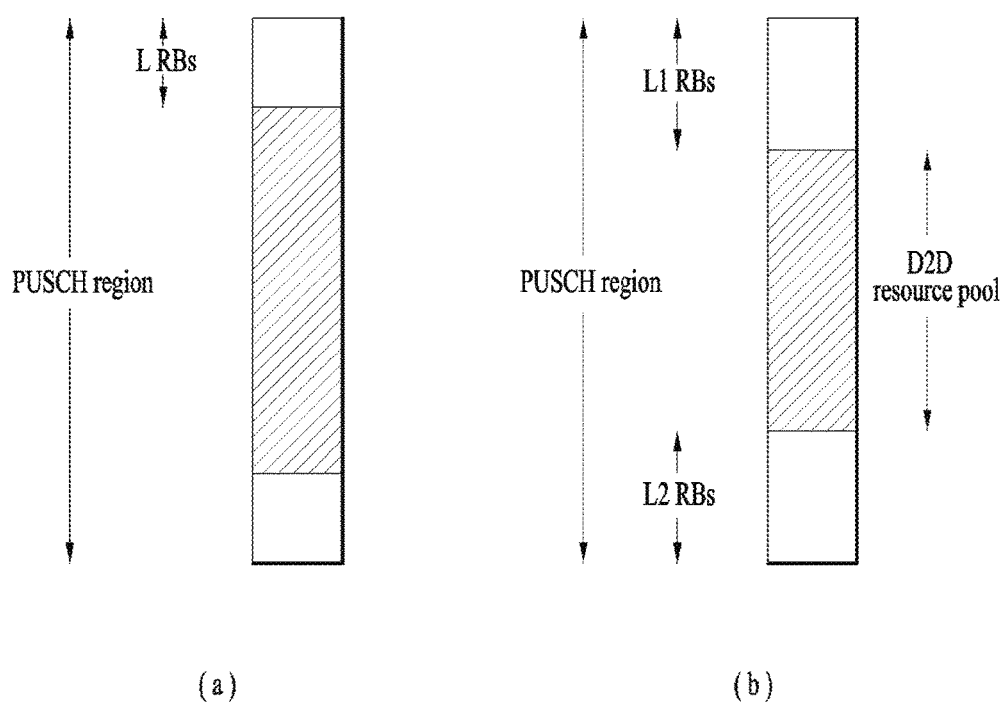

Hereinafter, a description will be given of a method of determining a resource pool and signaling the resource pool with reference to FIGS. 9 to 11.

FIG. 9(a) illustrates a method in which an offset value L is signaled and a PUSCH region except for L RBs at each of both edges of the region is used. Herein, the value L may be cell-specifically signaled not only to protect the PUCCH region but also to prevent a D2D resource pool from differing according to cells in performing inter-cell D2D communication when the cells have different sizes of PUCCH regions. In addition, the value of L may be set such that the D2D resource pool corresponds to an integer multiple of a D2D signal unit. FIG. 9(b) illustrates a method of indicating a D2D resource pool by configuring two values L1 and L2. Similar to FIG. 9(a), L1 and L2 may be cell-specifically configured.

Figure 10:
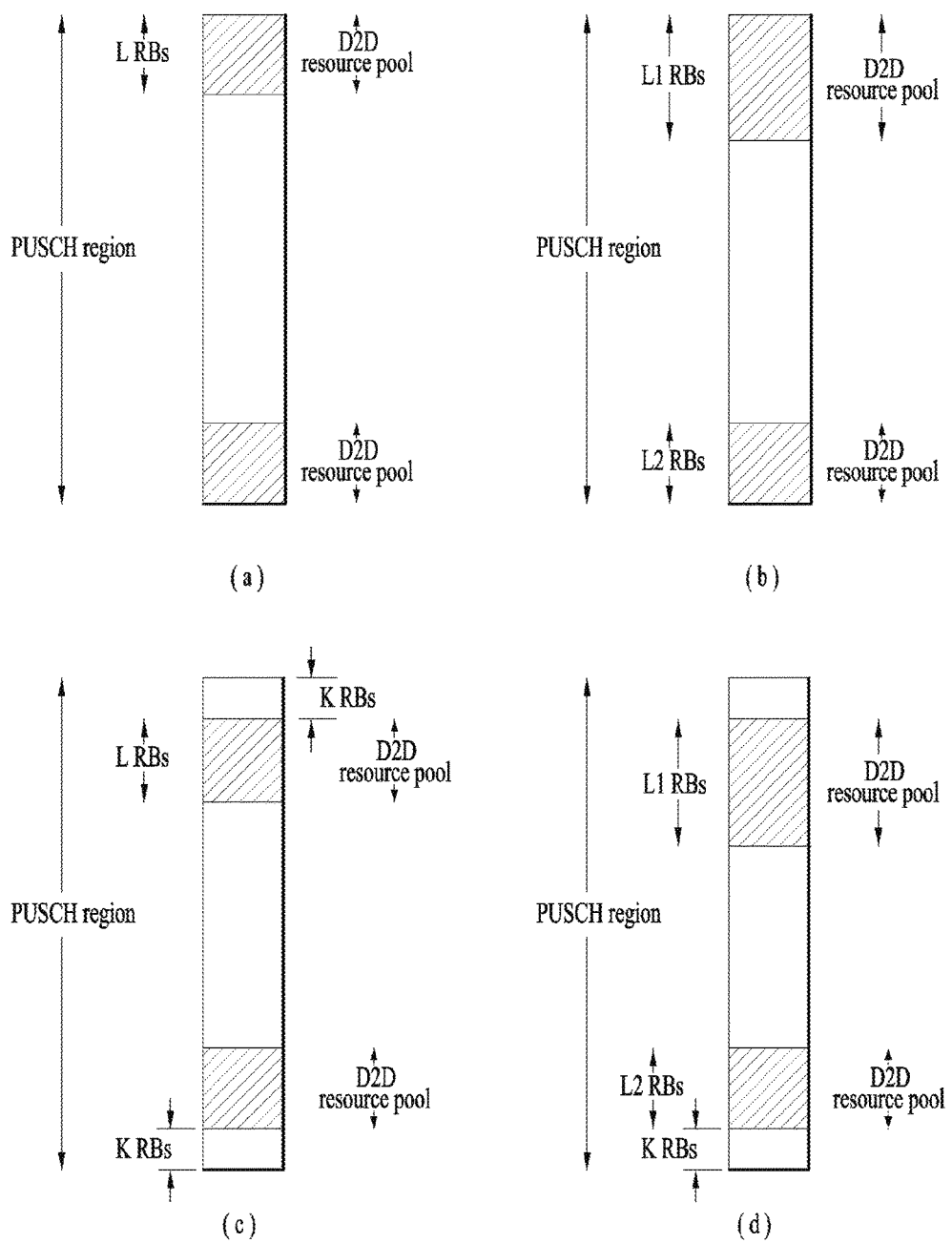
Figure 11:
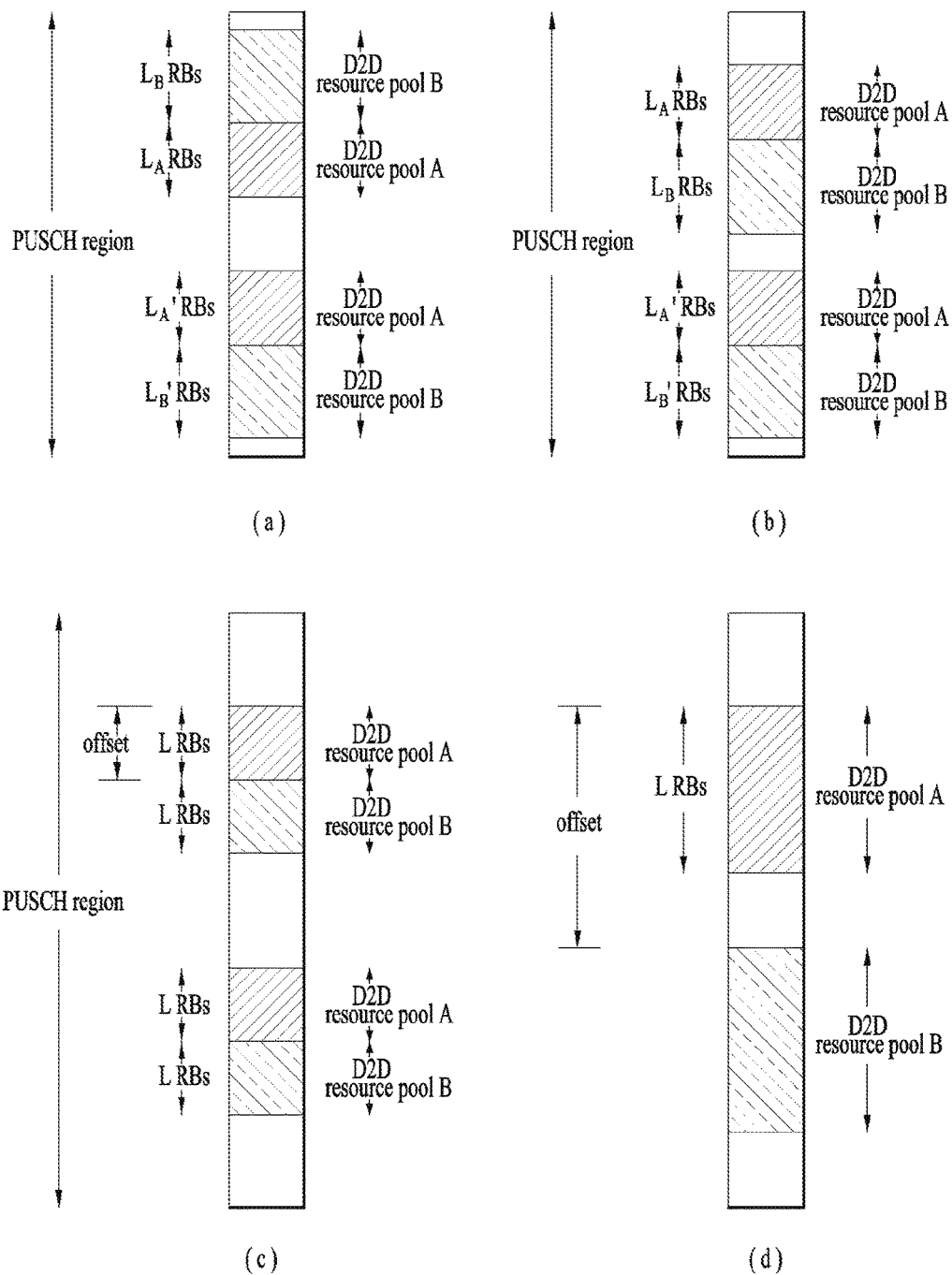

FIG. 10 illustrates a method of configuring D2D resources near a PUCCH region in order to prevent PUSCH resources of a Wireless Area Network (WAN) from being divided into several regions. FIG. 10(a) illustrates a method of determining a resource region when only L is signaled and FIG. 10(b) illustrates a method of determining the resource region when L1 and L2 are signaled. In methods illustrated in FIGS. 10(c) and 10(d), some RBs are used as a guard to protect the PUCCH region. To this end, a parameter K indicating the size of RBs to be used as a guard band may be additionally signaled or predetermined in addition to L or L1 and L2. In signaling K and L/L1/L2, i) both K and L (or L1 and L2) may be signaled in units of RBs, ii) K may be signaled in units of RBs and L (or L1 and L2) may be signaled in units of D2D signal unit sizes, or iii) both K and L (or L1 and L2) may be signaled in units of D2D signal unit sizes. FIGS. 10(c) and 10(d) illustrate exemplary determination of a frequency resource region when the guard is used.

D2D resource pools do not need to be symmetrical with respect to a center frequency in the frequency domain. To prevent PUSCH resources (of the WAN) from being fragmented, D2D resource pools biased towards a band edge, i.e., discontinuous D2D resource pools in the frequency domain, may be configured. By combining these two methods above, D2D resource pools asymmetrical with respect to the center frequency and discontinuous in the frequency domain may be configured. A method of signaling the D2D resource pools may include i) signaling of RB indexes of a start point and an end point of a discontinuous resource region in the frequency domain, ii) when discontinuous frequency resource regions in one D2D resource pool have the same size, signaling of only one parameter for the sizes of the resource regions, thereby reducing signaling overhead, or iii) signaling of a start point and/or an end point of the resource region and/or the size of each resource region in units of RBs or in units of D2D signal unit sizes in i) and ii). If D2D signals having several sizes are transmitted in one resource pool, signaling may be performed based on the smallest unit size, the largest unit size, or a specific unit size.

When the proposed methods are applied, if multiple D2D resource pools in a cell (e.g., a type 1 discovery resource pool and a type 2B discovery resource pool multiplexed in the frequency domain or D2D resource pools of multiple cells) are configured on the same time resource (e.g., subframe) or if multiple resource regions are discontinuously configured in each D2D resource pool in the frequency domain, discontinuous resource regions of each D2D resource pool may be disposed in every resource pool at a regular interval. In this case, each D2D resource pool may obtain uniform frequency diversity gain. When resource pools are configured only in a symmetric form in the frequency domain as illustrated in FIG. 11(a), if multiple D2D resource pools divided in the frequency domain are configured on the same time resource, D2D resource pools allocated close the center of a band may not obtain sufficient frequency diversity. To solve this problem, if symmetry with respect to a center frequency is eliminated and resources are flexibly allocated, frequency resources divided at the same interval are allocated to different D2D resource pools. FIG. 11(b) illustrates an embodiment of configuration of D2D resource pools which are discontinuous in the frequency domain and asymmetric with respect to the center frequency. In this case, two resource pools are multiplexed in the frequency domain and frequency resource regions divided in each resource pool have the same frequency spacing. Thereby, when frequency hopping is applied in each D2D resource pool, similar frequency diversity gain may be obtained. The proposed method has flexibility of implementing all methods illustrated in FIGS. 9 and 10 according to parameter configuration.

In this embodiment, LA and LB may be equal and LA (LB) and LA' (LB') may also be equal. The former corresponds to the case in which different resource pools multiplexed in the frequency domain are equally configured and the latter corresponds to the case in which discontinuous resource regions are configured to have the same size in the frequency domain. Both cases may serve as additional constraints in configuring resource pools. If the constraints are configured, signaling overhead may be reduced. For example, if LA=LA', a start point of each discontinuous resource region and the size of LA may be signaled to reduce signaling overhead. Alternatively, a start point of a first resource region and an end point of a second resource region may be signaled, while the first resource region may be defined to use LA RBs from the start point thereof and the second resource region may be defined to use LA RBs not exceeding the end point thereof. While one D2D resource pool has been explained as being configured by two discontinuous resource regions in the frequency domain in the above embodiment, the number of discontinuous resource regions in the frequency domain is not limited to 2. In some cases, the D2D resource pool may be divided into three or more resource regions and signaled. In these cases, a parameter indicating the number of resource regions into which one D2D resource pool is divided in the frequency domain may be signaled through a higher layer signal.

Meanwhile, if multiple D2D resource pools in a cell (or D2D resource pools of multiple cells) are configured, a frequency resource region for each D2D resource pool may be separately signaled. In this case, in order to reduce signaling overhead, only one piece of frequency resource information about a D2D resource pool may be signaled and a predetermined offset for the other resource pools may be signaled. The offset may be expressed as units of an RB or as a multiple of a unit size of a specific D2D signal. As illustrated in FIG. 11, when resource regions are discontinuously configured in the frequency domain, if multiple resource pools are configured in a cell in the frequency domain, only start and end RBs of each resource region in a resource pool may be signaled and the other D2D resource pools may be configured using a predetermined offset (by additionally signaling only one parameter). FIGS. 11(c) and 11(d) illustrate an embodiment of configuring multiple D2D resource pools by signaling frequency resource information about one resource pool and an offset for expressing multiple pools. Specifically, FIG. 11(c) illustrates configuration of multiple discontinuous D2D resource pools in the frequency domain and FIG. 11(d) illustrates configuration of multiple continuous D2D resource pools in the frequency domain.

The above description in the frequency domain may also be applied when a plurality of D2D resource pools is configured in the time domain. For example, when the multiple D2D resource pools are configured in the time domain, a predetermined offset may be signaled along with time resource information of a specific D2D resource pool to signal the multiple D2D resource pools. However, when the predetermined offset is applied in TDD, this method is problematic in that some subframes may not be UL subframes and thus cannot be usable as D2D resources. In this case, a rule may be determined such that only UL subframes in an SIB or a DL reference configuration (a configuration having the smallest number of UL subframes in eIMTA) are configured as a valid D2D resource pool. For example, when a bitmap for a specific D2D resource pool is signaled and an offset is signaled for the other D2D resource pools, only subframes, which are D2D subframes in a shifted bitmap and UL subframes in an SIB (or in a DL reference configuration), are defined as a D2D resource pool.

In the aforementioned method, while D2D resource pools have been described as being configured such that some RBs at an edge of the PUSCH region are unused, some RBs at an edge of system bandwidth rather than the PUSCH region may be configured not to be used. For example, L, L1, L2, and K may be commonly configured for a network not cell-specifically.

In the afore-mentioned method, granularity of a frequency resource pool may depend on a unit size of a D2D signal but a start point of the D2D resource pool (or the offsets L, L1, L2, and K from a PUCCH region) may be signaled in units of RBs. For example, if the D2D unit size is 2 RBs, when it is assumed that a=ceil(log 2($N_{RB}^{UL}$−1)) in continuous assignment of D2D resource pools, the number of bits corresponding to a (start point indication)+ceil(log 2(floor(($N_{RB}^{UL}$−a)/2))) (resource pool size indication) may be used to indicate a resource pool.

Indication of Frequency Resource Pool Configuration

Configuration related to a frequency resource pool according to the afore-described methods may be signaled through a bitmap. That is, the configuration may be signaled through the bitmap based on frequency resource granularity described above. In this case, each bit may indicate whether a corresponding region is used for D2D in a frequency resource pool. As a specific method for signaling the bitmap, a legacy PUSCH resource allocation method (refer to 8.1 of LTE specification 36.213) may be used. According to the legacy PUSCH resource allocation method, when it is assumed that a frequency PUSCH region includes N RBs, a total of $\lceil \log_2(N_{RB}^{UL}(N_{RB}^{UL}+1)/2 - N_{RB}^{UL}) \rceil$ bits are needed. If legacy PUSCH resource allocation type 0 is used, N RBs are present in the frequency domain, and the frequency resource granularity M is 2 or more RBs, then $N_{RB}^{UL}$ may be replaced by $\lfloor N_{RB}^{UL}/M \rfloor$. If a minimum size of a D2D resource pool is predetermined, the number of bits may be further reduced. The minimum size of the D2D resource pool may be preset to a specific value or determined by a D2D signal unit. In this case, bits for resource configuration less than the minimum size of the D2D resource pool may not be used. For example, if the D2D unit size is 2, resource allocation when an RB size is 1 is not necessary. In this case, if resource configuration indication granularity is in an RB unit, the number of bits indicting a transmitted resource pool may be reduced as given by $\lceil \log_2(N_{RB}^{UL}(N_{RB}^{UL}+1)/2 - N_{RB}^{UL}) \rceil$. If PUSCH resource allocation type 1 (i.e., discontinuous frequency allocation) is used, $N_{RB}^{UL}$ may be replaced by $\lfloor N_{RB}^{UL}/M \rfloor$. In this case, if a minimum size per cluster is predetermined, the number of bits indicating a resource pool may be reduced by bits corresponding to configuration less than the minimum cluster size. As another example, when configurations related to frequency resource pools are signaled through granularity of a D2D resource pool and an offset, the offset is desirably in units of RBs but the granularity of a D2D resource pool may be used for simplicity.

Indication of Time Resource Pool Configuration

A time resource pool may be signaled through a bitmap in units of subframes. In this case, the length of the bitmap may be configured to be in units of radio frames, a predetermined subframe length (e.g., 40 ms), a predetermined set which can be pre-configured as the length of the bitmap (e.g., when a set such as {8, 10, 20, 40, 64, 128} is determined), or a length indicted by a specific element in the set. Frequency resource pool configuration for every subframe may not be indicated under the assumption that the same frequency resource pool is configured in all D2D subframes. In this case, in order to indicate a radio frame/subframe to which the bitmap is applied, a subframe offset a may also be signaled. That is, the bitmap is applied starting from a subframe indicated by the subframe offset a to indicate a D2D resource region (resource pool). The size of a frequency pool may differ according to each subframe. In this case, a frequency resource pool configuration may be separately signaled for each subframe.

Meanwhile, if the period of a D2D resource pool exceeds a range that can be expressed as a System Frame Number (SFN) (SFN ranges from 0 to 1023 and may indicate only positions within 10240 ms), it may be impossible to express the period with the existing SFN range. In other words, if the period of the D2D resource pool exceeds 10.24 seconds, the period cannot be expressed as the SFN and other methods to express the D2D resource pool are needed. One of the following methods may be used.

First, only a period within 10.24 seconds may be configured as the period of the D2D resource pool. That is, when a period that can be configured by a network is expressed in units of radio frames, 1024 is a maximum value of a configurable period.

Second, if the period of the D2D resource pool exceeds 10.24 seconds, particularly, if the period is a multiple of 10.24 seconds, it may be assumed that a resource pool is configured only at a specific position among multiples of 10.24 seconds. For example, when the period of 2048 radio frames is configured, the eNB configures a D2D resource pool only within the first 1024 radio frames. This operation may selectively occur only when the period of the D2D resource pool exceeds 1024. That is, if the period of the D2D resource pool is within 10.24 seconds, the eNB may always configure the resource pool. However, if the period of the D2D resource pool exceeds 10.24 seconds, the eNB may configure the D2D resource pool only at a specific position (e.g., if the period of the D2D resource pool is 20.48 seconds, the D2D resource pool may be configured only at an even multiple or odd multiple of 10.24 seconds) among multiples of 10.24 seconds.

Figure 12:
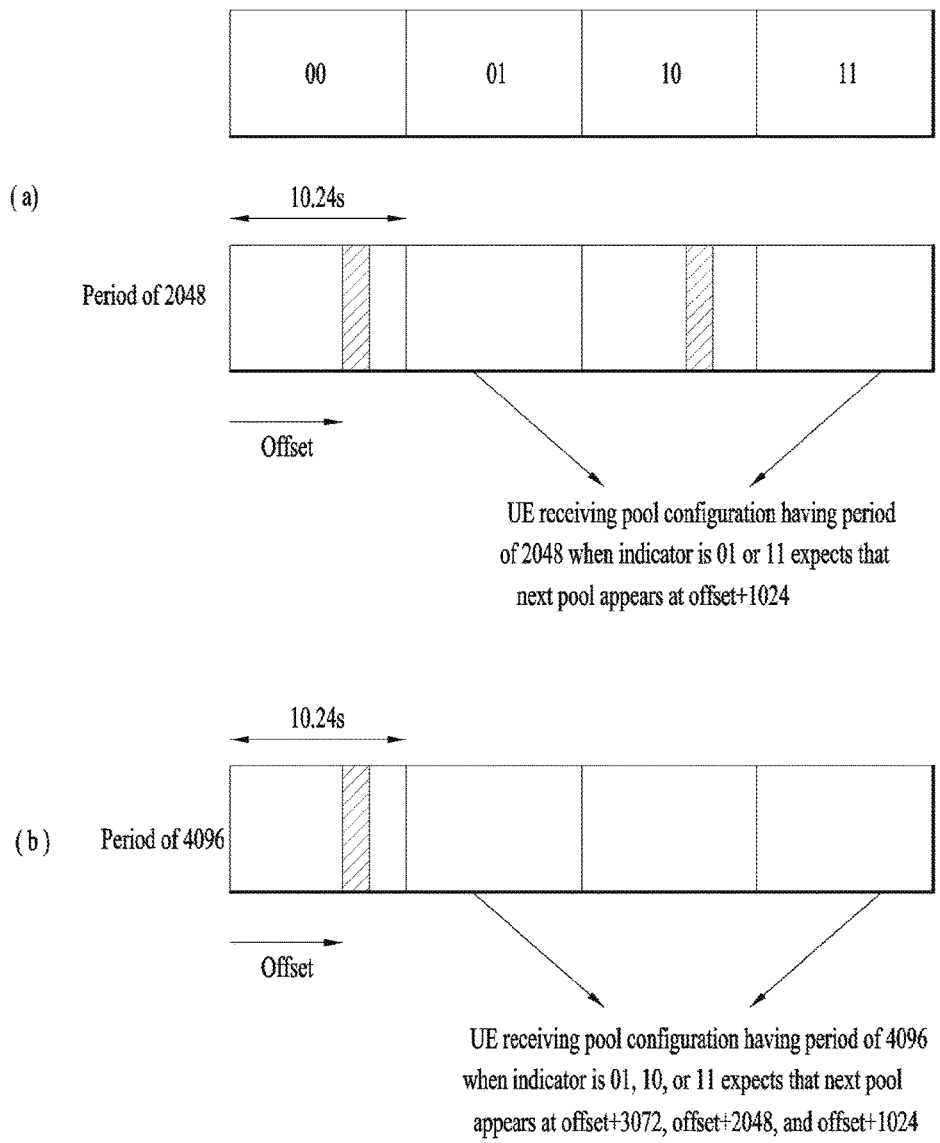

Third, it is proposed that the eNB transmit an indication bit indicating a position at which the eNB configures the D2D resource pool in a multiple of 10.24 seconds. For example, if a maximum period of the D2D resource pool is 40.96 seconds, a 2-bit indicator is transmitted. A specific example of the 2-bit indicator will now be described with reference to FIG. 12. i) If the indicator indicates 00, a current SFN is applied to a radio frame offset, ii) if the indicator indicates 01 or 11 and the period is 2048, SFN+1024 is applied to the radio frame offset, and iii) if the indicator indicates 01, 10, or 11 and the period is 4096, a UE receiving a pool configuration having the period of 4096 when the next pool is indicated by 01, 10, or 11 expects that the next pool will appear at offset+3072, offset+2048, or offset+1024.

Reception of Neighbor Cell D2D Synchronization Signal and Acquisition of Neighbor Cell Resource Configuration Therethrough Not only a D2D resource pool of a serving cell but also a D2D resource pool of a neighbor cell may be signaled through a physical layer or higher layer signal. Alternatively, a plurality of D2D resource pools may be configured in a cell. Only when the serving cell signals D2D resources of neighbor cells, D2D communication between UEs of different cells may be performed. This is because a D2D UE of the serving cell D2D will attempt to perform decoding in a corresponding region only when the UE is aware of the D2D resource region of a neighbor cell. A method for signaling resource pools of neighbor cells may depend on whether or not timing synchronization is established between the neighbor cells. Whether the serving cell is synchronized or not with the neighbor cells may be determined through higher layer signaling.

In an asynchronous network, a UE may receive an offset parameter indicating a transmission position of a D2D synchronization signal and receive the D2D synchronization signal using the offset parameter. The UE may assume that the D2D synchronization signal is transmitted within +/−x ms from a resource indicated by the offset parameter. Upon receiving the synchronization signal on this assumption, the UE may acquire a subframe boundary of a neighbor cell and interpret a D2D resource pool of the neighbor cell.

The asynchronous network may be categorized into a first case in which a clock drift between cells continues to be corrected such that a synchronization error between two cells is within a few milliseconds (ms) and a second case in which synchronization information cannot be acquired (at all) between networks and thus even an approximate value of the error cannot be estimated. In the first case, offset information about a resource pool of a neighbor cell may be pre-signaled and a UE receiving this information may acquire an accurate subframe boundary by searching for a D2DSS of the neighbor cell within a range of the offset or for +/−x msec around the offset. In contrast, in the second case, since the UE is not aware of the offset information, the UE should search for the D2DSS of the neighbor cell in all regions. Accordingly, in the second case, the UE needs to perform an operation of searching for the D2DSS of the neighbor cell in all regions. In the second case, D2D resource pool information of the neighbor cell may be signaled based on SFN #0 of the neighbor cell (hereinafter, SFN #0 will refer to a start point of SFN #0, i.e., a start time of subframe #0 of SFN #0 unless stated otherwise). Upon receiving the D2DSS, the UE may acquire an SFN of the neighbor cell through the D2DSS or a PD2DSCH and interpret the D2D resource pool of the neighbor cell based on the acquired SFN. If the PD2DSCH is not transmitted, all or some of a D2DSS transmission period, a subframe number, and a radio frame number (radio frame offset) of the neighbor cell may be signaled. The UE may then detect the D2DSS and acquire the SFN of the neighbor cell.

Figure 13:
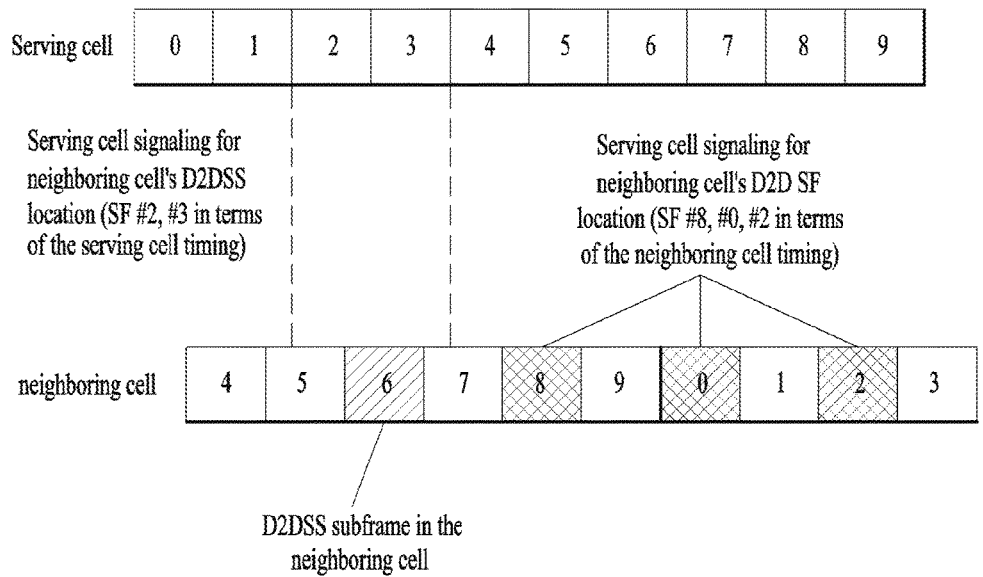

In the first case, information about a D2DSS transmission pool of a neighbor cell (a D2DSS transmission subframe, period, and a subframe/radio frame offset based on SFN0) may be pre-signaled to aid in searching for the D2DSS of the neighbor cell. That is, a D2D resource pool of the neighbor cell and a region in which the D2DSS of the neighbor cell is transmitted may be pre-signaled together with a D2D resource pool of a serving cell. In this case, the network may signal, through a physical layer signal or a higher layer signal, an approximate region in which the D2DSS of the neighbor cell is transmitted based on SFN #0 of the serving cell. For example, the region in which the D2DSS of the neighbor cell is transmitted may be signaled by being expressed in the form of an offset in the D2DSS transmission pool of a current serving cell. Alternatively, a D2DSS transmission position of the neighbor cell may be expressed in the form of an offset based on SFN #0 of the serving cell and signaled, separately from the D2DSS transmission pool of the current serving cell. If the (approximate) transmission region of the D2DSS of the neighbor cell is signaled, the UE searches for the D2DSS of the neighbor cell first in order to receive a D2D signal of the neighbor cell. In this case, the UE searches for the D2DSS in a region corresponding to D2DSS transmission offset+/−x msec because it is difficult to know an accurate timing of the neighbor cell. Herein, the value of x may be predetermined or signaled through a higher layer signal. Upon successfully receiving the D2DSS, the UE may acquire an SFN of the neighbor cell through a PD2DSCH or the D2DSS and recognize a position of an SFN at which the D2D resource pool of the neighbor cell is located among SFNs of the neighbor cell. To this end, the D2D resource pool of the neighbor cell may be expressed based on SFN #0 of the neighbor cell and signaled through a physical layer signal or a higher layer signal. For example, the serving cell informs the UE of a certain time interval represented by a timing of the serving cell (i.e., a time indicated by the SFN of the serving cell and a subframe index) and informs the UE that a D2DSS of a specific neighbor cell is transmitted in the time interval. This interval may be a single subframe (i.e., a 1-ms interval) in terms of a serving cell timing but may be a plurality of subframes (i.e., an interval equal to or longer than 1 ms) in order to sufficiently consider a synchronization error between cells. FIG. 13 shows this example. Referring to FIG. 13, subframes 2 and 3 of the serving cell are designated as such subframes and the UE attempts to detect a D2DSS of the neighbor cell in the corresponding region. In the example of FIG. 13, it is assumed that the D2DSS is transmitted in subframe 6 of the neighbor cell which is present in an interval represented by subframes 2 and 3 of the serving cell. The UE may detect the D2DSS and a PD2DSCH associated with the D2DSS and acquire an accurate timing, an SFN, and a subframe index of the neighbor cell. The serving cell informs the UE of a position of a D2D subframe of the neighbor cell. The position of this subframe is represented by a timing of the neighbor cell (i.e., a time indicated by an SFN and a subframe index of the serving cell). In FIG. 13, subframes #8, #0, and #2 are allocated to D2D subframes as the timing of the neighbor cell and the UE identifies a D2D subframe position of the neighbor cell using the identified timing of the neighbor cell and signaling of the serving cell.

The above operation may be performed by simply signaling a D2D resource pool of the neighbor cell and an offset (which is used to indicate a timing difference between the neighbor cell and the serving cell). In this case, the offset may be signaled in units of subframes or in units smaller than a subframe. For example, the offset may be signaled in units of microseconds (μs). This serves to indicate accurate offset information as the serving cell is aware of information about misalignment of timing synchronization between the neighbor cell and the serving cell. If the offset is signaled in units of subframes, the UE needs to detect the D2DSS of the neighbor cell and identify an accurate subframe boundary as mentioned above. If the subframe boundary and the SFN of the neighbor cell are identified (through D2DSS and/or PD2DSCH), a D2D resource pool of the neighbor cell may be recognized based on the SFN of the neighbor cell.

Meanwhile, the aforementioned timing offset between cells should be differentiated from the offset of each resource pool. In the above description, the expression "based on the SFN" means an offset of a position of the D2D resource pool based on subframe #0 of SFN #0 and the timing offset between cells means an offset used to indicate misalignment of subframe boundaries between cells. In this way, the D2D resource pool of the neighbor cell is signaled through the two offsets. For convenience of description, the timing offset between cells will be referred to offset 1 and the offset indicating the position of the D2D resource pool based on SFN#0 will be referred to as offset 2. If there is no way to know the boundary of a neighbor cell in the asynchronous network, signaling of offset 1 may be omitted. That is, offset 1 may be signaled only when the cells are synchronized or an approximate degree of inequality of inter-cell synchronization can be recognized. Alternatively, the resource pool offset may be differently interpreted according to cases. In more detail, deployment in which inter-cell synchronization is established or deployment in which inter-cell synchronization is not established but an approximate degree of inequality of inter-cell synchronization can be approximately recognized, the D2D resource pool of the neighbor cell may be configured to transmit only one offset (=offset 1+offset 2) based on SFN#0 of the service cell. In the case of asynchronous deployment in which synchronization of the neighbor cell cannot be recognized, only one offset (=offset 2) based on SFN#0 of the neighbor cell may be configured to be transmitted. That is, one or two offsets may be signaled according to deployment. Alternatively, only one offset, the meaning of which is differently interpreted according to deployment, may be signaled.

Figure 14:
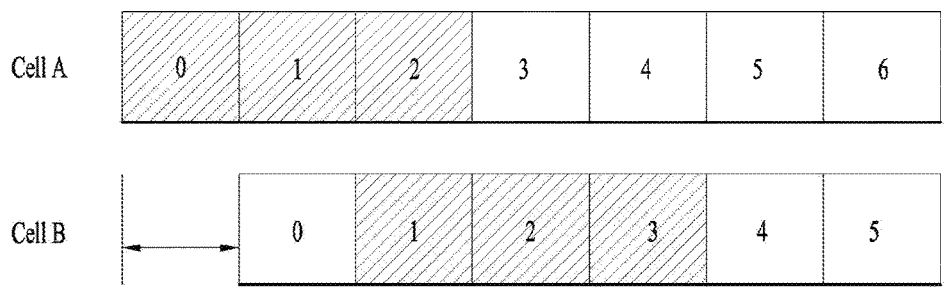

In some cases, subframe indexes and/or boundaries of neighbor cells differ and indexes of D2D resource pools of the neighbor cells also differ. For example, the case is considered in which subframes #0, #1, and #2 are used for a D2D resource pool in cell A, subframes #1, #2, and #3 are used for a D2D resource pool in cell B, and a timing offset between the two cells is one subframe based on cell A. This example is illustrated in FIG. 14. In this case, a UE of cell A and a UE of cell B may recognize different subframe indexes in subframe #2 of cell A.

In this case, a D2D resource pool may be configured using the following methods. First, a resource pool of a serving cell may be signaled based on a subframe index of the serving cell and a resource pool of a neighbor cell may be signaled based on a subframe index of the neighbor cell. In this case, a subframe offset is separately signaled or a D2DSS transmission subframe of the neighbor cell is signaled. A subframe index in which a D2DSS of the neighbor cell is transmitted may be signaled through a physical layer signal or a higher layer signal. Alternatively, a subframe index in which the D2DSS of the neighbor cell is transmitted may be pre-fixed to a specific value or to a value such as a subframe index transmitted from the serving cell (i.e., subframe indexes in which D2DSSs of the cells are transmitted are equal). Second, resource pools of the serving cell and the neighbor cell may be signaled based on a subframe index of the serving cell. In this case, an offset of a subframe index of the neighbor cell may be separately signaled through a higher layer signal, or a D2DSS transmission subframe or a D2DSS transmission region of the neighbor cell may be signaled through a physical layer signal or a higher layer signal and a subframe index in which the D2DSS of the neighbor cell is transmitted may be signaled through a physical layer signal or a higher layer signal. Alternatively, the subframe index in which the D2DSS of the neighbor cell is transmitted may be pre-fixed to a specific value or to a value such as a subframe index transmitted from the serving cell (i.e., subframe indexes in which D2DSSs of the cells are transmitted are equal).

Meanwhile, while the D2D resource pool of the neighbor cell has been signaled based on the SFN or subframe number of the neighbor cell in the above proposed methods, the D2D resource pool of the neighbor cell may be signaled based on a timing (SFN or subframe index) of the serving cell. When the D2D resource pool of the neighbor cell is signaled based on the timing of the serving cell, since a subframe or a radio frame of the D2D resource pool of the neighbor cell may not be accurately synchronized in terms of the serving cell, the position of a signaled subframe may be ambiguous. This problem occurs when a synchronization offset between two cells is not an integer multiple of a subframe level. To identify the position of the synchronization offset, one of the following three methods may be used.

Figure 15:
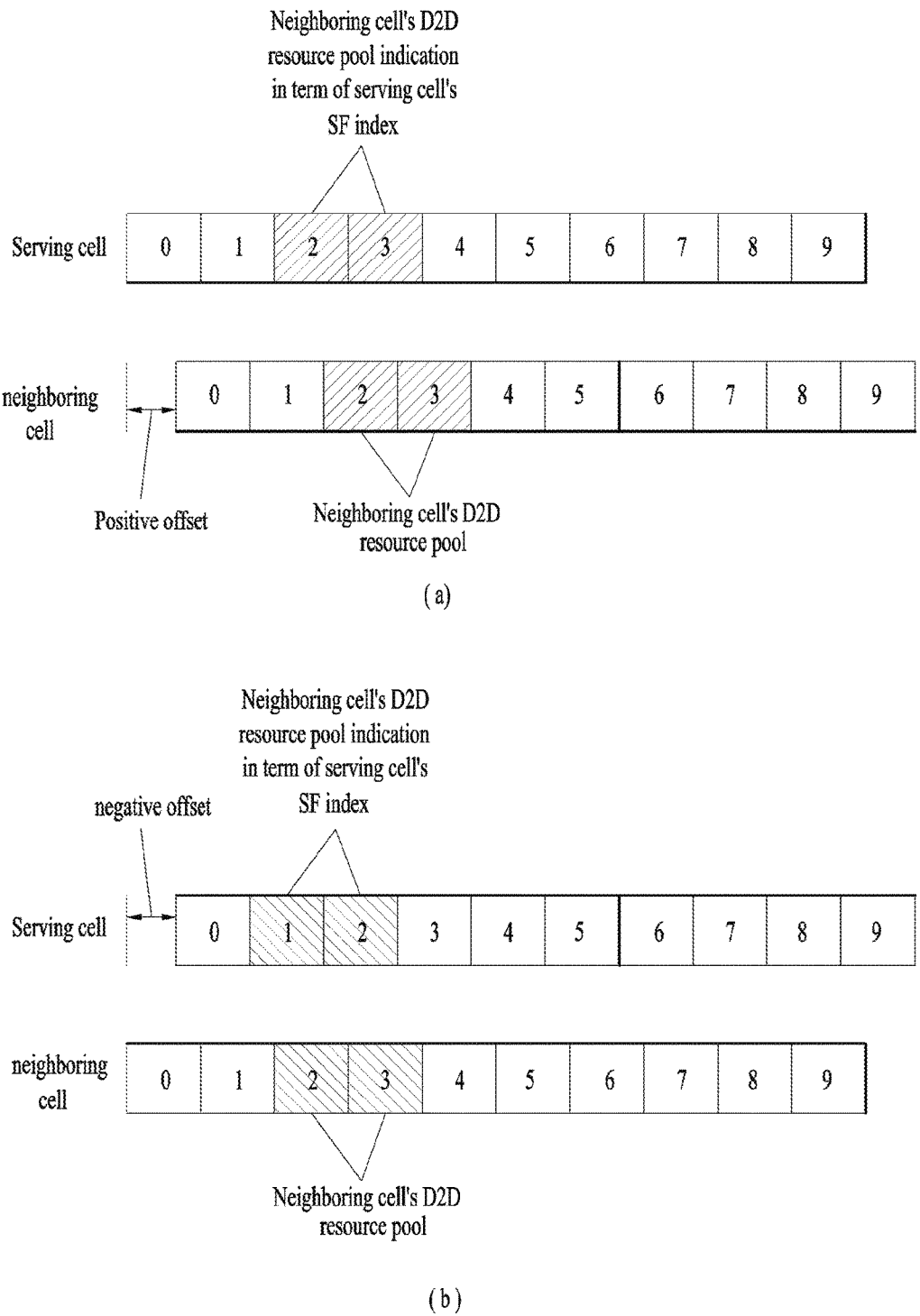

First, it may be assumed that an actual D2D resource pool of the neighbor cell is necessarily present at or after a timing indicated by the serving cell. That is, upon indicating the D2D resource pool of the neighbor cell, the eNB of the serving cell should indicate the D2D resource pool of the neighbor cell such that the D2D resource pool of the neighbor cell is present at or after a timing corresponding to a subframe index indicated in consideration of a subframe offset. FIG. 15 illustrates embodiments of how the serving cell indicates the D2D resource pool of the neighbor cell through subframe indexes when the subframe offset is positive (when the timing of the neighbor cell comes after the timing of the serving cell) and when the subframe offset is negative. FIG. 15(a) illustrates the case in which the serving cell signals the D2D resource pool of the neighbor cell through subframe indexes 2 and 3 when the subframe offset between two cells is a positive number. FIG. 15(b) illustrates the case in which the serving cell signals the D2D resource pool of the neighbor cell through subframe indexes 1 and 2 when the subframe offset is a negative number.

Figure 16:
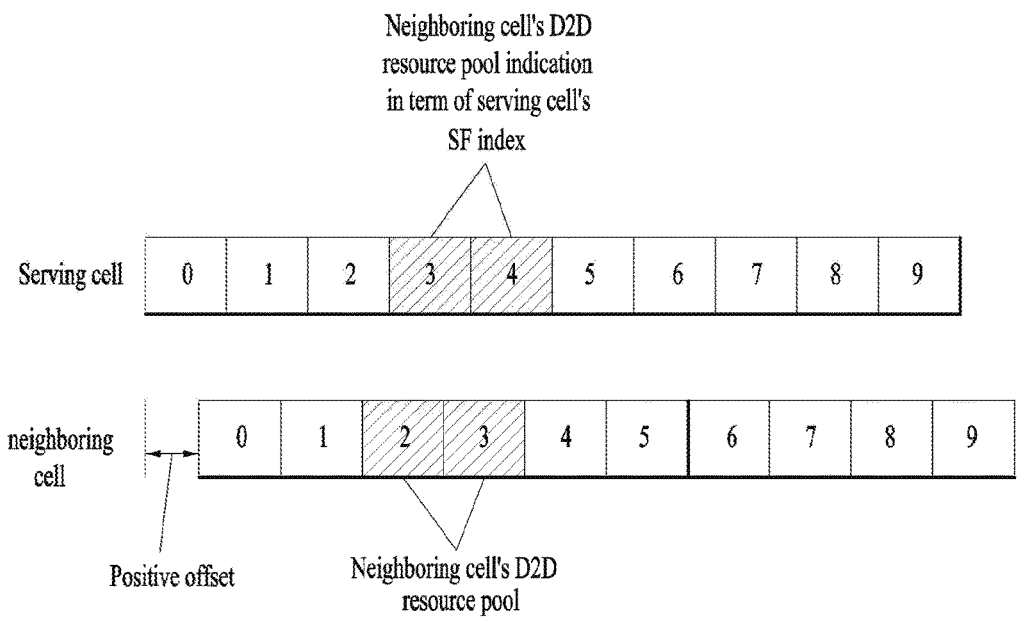

Second, it is assumed that the actual D2D resource pool of the neighbor cell is necessarily present at or before the timing indicated by the serving cell. FIG. 16 illustrates an embodiment in which the serving cell indicates the D2D resource pool of the neighbor cell when a synchronization offset between two cells is positive based on the serving cell.

Third, it may be assumed that the actual D2D resource pool of the neighbor cell is present within +/−a subframes based on the timing indicated by the serving cell. For example, a may be 0.5 or half a CP length. The former case may be interpreted as in-synchronization of the two cells in units of subframes and the latter case may be interpreted as almost in-synchronization in units of symbols. This method corresponds to the case in which the eNB of the serving cell indicates a D2D resource pool of the neighbor cell based on a subframe nearest a current subframe boundary. For example, if a timing offset of the neighbor cell is positive based on a timing of the serving cell and exceeds 0.5 subframes, it is assumed that the D2D resource pool of the neighbor cell is present before the timing of the serving cell. If the timing offset of the neighbor cell is positive based on the timing of the serving cell and does not exceed 0.5 subframes, it is assumed that the D2D resource pool of the neighbor cell is present after the timing of the serving cell. FIG. 17 illustrates this example. Even when the value of the offset is negative, the D2D resource pool of the neighbor cell may be signaled based on a subframe nearest a boundary.

Meanwhile, consider that a timing offset between the serving cell and the neighbor cell is generated at the subframe level. When an offset of the subframe level between the serving cell and the neighbor cell is generated, if a slot/subframe index is included upon generating a scrambling sequence and DMRS sequence of a D2D signal (determining a hopping pattern and a DMRS Cyclic Shift (CS)/Orthogonal Cover Code (OCC) hopping pattern), a D2D reception UE should perform decoding for different subframe indexes. In this case, complexity of the reception UE may increase. To prevent this phenomenon, it is proposed that the slot/subframe index be fixed to a specific value upon generating the DMRS sequence and scrambling sequence of the D2D signal. This method can prevent decoding from being performed several times using a subframe index of the serving cell and a subframe index of the neighbor cell when the neighbor cell and the serving cell are not accurately synchronized and thus subframe indexes of the neighbor cell and the serving cell differ. In addition, a subframe offset between the neighbor cell and the serving cell do not need to be separately signaled.

As another method, a network configuration may be restricted such that a subframe level offset between the serving cell and the neighbor cell is always fixed to 0. If only the UE generates a DMRS and scrambling sequence in synchronization with a subframe index of the serving cell, the subframe index is directly applicable to the neighbor cell. If an offset between the serving cell and the neighbor cell is present in a time unit smaller than a subframe as described with reference to FIGS. 12 to 14, a subframe index of the neighbor cell is derived using the above-described method, wherein an offset between the subframe index of the neighbor cell and a subframe index of the serving cell at a subframe level is assumed to be 0. Alternatively, the operation of always fixing the offset at the subframe level to 0 may be restrictively applied only when the serving cell and the neighbor cell are synchronized (e.g., when a D2DSS is shared therebetween). In this case, a neighbor cell which is not synchronized with the serving cell may still have an offset other than 0 at a subframe level with respect to the serving cell. It is apparent that this operation may be generalized and applied to an operation between neighbor cells (e.g., an operation in which one neighbor cell serves as a reference for a subframe index and a resource pool is configured for the other neighbor cells based on the reference neighbor cell). For example, other neighbor cells sharing a D2DSS with the reference neighbor cell operate (e.g., generating a DMRS or a scrambling sequence) under the assumption that an offset at a subframe level therebetween is 0, and the network configures the same subframe index in corresponding cells on this assumption.

Meanwhile, it may be assumed that cells, D2D resource pools of which are distinguished by a time offset, are synchronized. In this case, "synchronized" may mean that subframe boundaries are aligned between the cells and subframe indexes of the cells also coincide. In such a situation of a synchronous network, a signal for a D2DSS transmission region of a neighbor cell may not be separately transmitted. In this case, a UE may share a D2DSS sequence or a D2D resource pool on the assumption that the serving cell and the neighbor cell are synchronized. Alternatively, D2D resource pools of the cells may be distinguished by an offset. Herein, the offset simply means that the cells use the D2D resource pools using different time resources. In generating and decoding a DMRS sequence or a scrambling sequence, all signals are transmitted/received based on a subframe index of the serving cell. Meanwhile, information indicating that the neighbor cell and the serving cell are synchronized may be pre-signaled through a physical layer signal or a higher layer signal. It may be pre-assumed that cells of a group having specific cell IDs are synchronized. In this case, the cells of the group having synchronized cell IDs may be signaled to a UE by a network through a physical layer signal or higher layer signal.

In another case, the subframe boundaries may be aligned between neighbor cells but subframe indexes of the neighbor cells may not coincide. In this case, an eNB of a serving cell may signal a subframe offset between the serving cell and a neighbor cell to the UE through a physical layer signal or a higher layer signal. This offset may be used to instruct a D2D signal transmission UE to generate a DMRS sequence or a scrambling sequence according to a subframe index of a specific cell in consideration of the subframe offset. Alternatively, the subframe offset may be used for a D2D signal reception UE to recognize and decode the DMRS sequence and scrambling sequence of the neighbor cell in consideration of the subframe offset.

Similar to the feature that a D2DSS or a D2D resource pool can be shared between synchronized cells, some cells in an asynchronous system may have identical subframe boundaries and subframe indexes. In this case, a D2D resource pool and a D2DSS transmission region may be shared. All or some of information about a D2D resource pool, a resource subframe offset, a D2DSS transmission region, a D2DSS subframe index, and an offset of other neighbor cells and neighbor cell groups which are out of synchronization may be shared between cells which are in synchronization.

The proposed method may be identically applied to inter-cell, inter-frequency, and inter-operator D2D operations. For example, assuming that a network operator operates multiple carriers, a network timing of another frequency band may be different from a timing of a current serving cell. In this case, a network signals an approximate D2DSS transmission region of another cell to the UE through a physical layer signal or a higher layer signal, based on an SFN of the current serving cell. In addition, the network expresses a D2D resource pool of another frequency based on SFN #0 of a corresponding cell and signals the same through a physical layer signal or a higher layer signal. After detecting a D2DSS of a neighbor cell first, the UE only needs to identify an SFN of the neighbor cell and receive a D2D signal in a D2D resource pool of the neighbor cell.

Generation of Scrambling Sequence

Hereinafter, a method of generating a scrambling sequence in D2D will be described. In generating a scrambling sequence of a legacy LTE PUSCH, initialization parameter configuration is determined by $c_{init}=n_{RNTI} \cdot 2^{14} + q \cdot 2^{13} + \lfloor n_s/2 \rfloor \cdot 2^9 + N_{ID}^{cell}$. With respect to a D2D signal, $n_{RNTI}$ and $N_{ID}^{cell}$ may be set to have different values according to a D2D characteristic. For example, an ID included in SA or a cell ID may be set to a value (e.g., 510) exceeding an existing cell ID range. In this case, $n_s$ may be fixed to a specific value in generating a scrambling sequence of the D2D signal. For example, $n_s$ may be fixed to 0 regardless of a slot index. Alternatively, $n_s$ may be fixed to a different value according to D2D signal type or mode.

A DMRS sequence of the legacy LTE PUSCH is generated by the following equation.

$$x_q(m) = e^{-j\frac{\pi q m(m+1)}{N_{ZC}^{RS}}}, \quad 0 \le m \le N_{ZC}^{RS} - 1$$

$$q = \lfloor \bar{q} + 1/2 \rfloor + v \cdot (-1)^{\lfloor 2\bar{q} \rfloor}$$

$$\bar{q} = N_{ZC}^{RS} \cdot (u+1)/31$$

$$u = (f_{gh}(n_s) + f_{ss}) \bmod 30$$

$$f_{gh}(n_s) = \begin{cases} 0 & \text{if group hopping is disabled} \\ \left( \sum_{i=0}^{7} c(8n_s + i) \cdot 2^i \right) \bmod 30 & \text{if group hopping is enabled} \end{cases}$$

$$c_{init} = \left\lfloor \frac{n_{ID}^{RS}}{30} \right\rfloor$$

$$f_{ss}^{PUSCH} = (N_{ID}^{cell} + \Delta_{ss}) \bmod 30$$

In the above equation, $N_{ID}^{cell}$ is a cell ID value and $\Delta_{ss}$ is a value received by a higher layer. In addition, v is given as $$v = \begin{cases} c(n_s) & \text{if group hopping is disabled} \\ & \text{and sequence hopping is enabled.} \\ 0 & \text{otherwise} \end{cases}$$

Herein, $c_{int}$ for $c(i)$ is determined by $$c_{init} = \left\lfloor \frac{n_{ID}^{RS}}{30} \right\rfloor \cdot 2^5 + f_{ss}^{PUSCH}.$$

$n_{ID}^{RS}$ is determined by the cell ID or higher layer signaling and $f_{ss}^{PUSCH}$ is determined by the above equation. In this case, $n_{ID}^{RS}$, $N_{ID}^{cell}$, and $\Delta_{ss}$ may be set to different values in D2D. For example, $n_{ID}^{RS}$ may be generated by the ID included in SA, $N_{ID}^{cell}$ may be set to a value (e.g., 510 or 511) exceeding the ID range or a value obtained by adding the ID included in SA to the value exceeding the cell ID range, and $\Delta_{ss}$ may be set to 0. In the above equation for generating a DMRS, $n_s$ may be fixed to a specific value, used as a slot index of a specific cell, or determined by a subframe offset between neighbor cells in a slot index of a serving cell.

Configuration of Apparatuses According to Embodiment of the Present Invention

Figure 18:
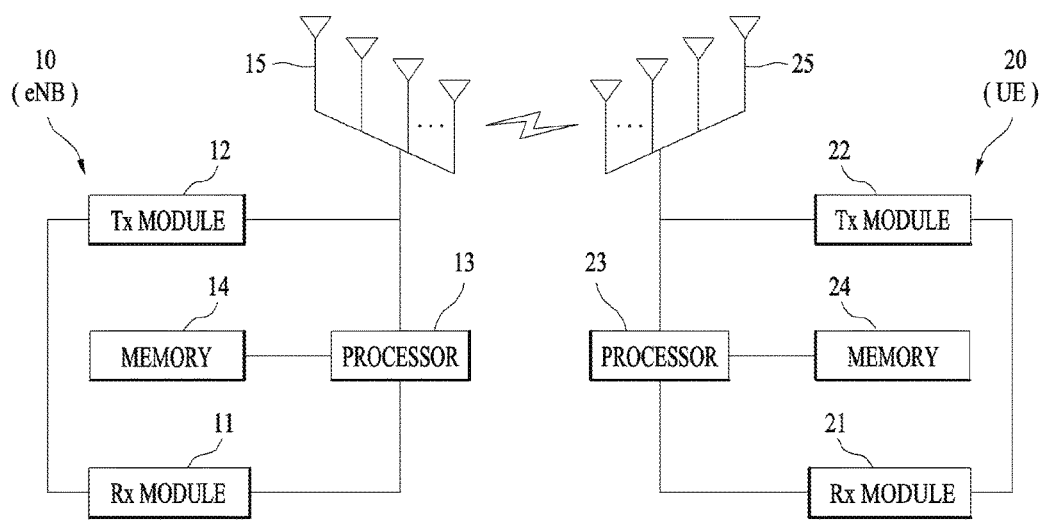
FIG. 18 is a diagram illustrating configuration of transmission and reception apparatuses.

FIG. 18 is a diagram illustrating configuration of a transmission point and a UE according to an embodiment of the present invention.

Referring to FIG. 18, a transmission point 10 according to the present invention may include a Reception (Rx) module 11, a Transmission (Tx) module 12, a processor 13, a memory 14, and a plurality of antennas 15. Use of the plurality of antennas 15 means that the transmission point 10 supports MIMO transmission and reception. The Rx module 11 may receive UL signals, data, and information from a UE. The Tx module 12 may transmit DL signals, data, and information to a UE. The processor 13 may provide overall control to the transmission point 10.

The processor 13 of the transmission point 10 according to the embodiment of the present invention may perform necessary operations in the afore-described embodiments.

The processor 13 of the transmission point 10 processes received information and information to be transmitted to the outside of the transmission point 10. The memory 14 may store the processed information for a predetermined time and may be replaced with a component such as a buffer (not shown).

Referring to FIG. 18 again, a UE 20 according to the present invention may include an Rx module 21, a Tx module 22, a processor 23, a memory 24, and a plurality of antennas 25. Use of the plurality of antennas 25 means that the UE 20 supports MIMO transmission and reception using the plurality of antennas 25. The Rx module 21 may receive DL signals, data, and information from an eNB. The Tx module 22 may transmit UL signals, data, and information to an eNB. The processor 23 may provide overall control to the UE 20.

The processor 23 of the UE 20 according to the embodiment of the present invention may perform necessary operations in the afore-described embodiments.

The processor 23 of the UE 20 processes received information and information to be transmitted to the outside of the UE 20. The memory 24 may store the processed information for a predetermined time and may be replaced with a component such as a buffer (not shown).

The above transmission point and UE may be configured in such a manner that the various embodiments of the present invention described above may be implemented independently or in combination of two or more thereof. A redundant description is omitted for clarity.

The description of the transmission point 10 in FIG. 18 is identically applicable to a relay as a DL transmitter or a UL receiver, and the description of the UE 20 in FIG. 18 is identically applicable to a relay as a DL receiver or a UL transmitter.

The embodiments of the present invention may be implemented by various means, for example, in hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present invention or included as a new claim by subsequent amendment after the application is filed.

INDUSTRIAL APPLICABILITY

The above-described embodiments of the present invention are applicable to various mobile communication systems.

What is claimed is:

1. A method of transmitting a Device-to-Device (D2D) signal by a D2D User Equipment (UE) in a wireless communication system, the method comprising:
    determining a time-frequency resource region in which the D2D signal is to be transmitted in a subframe; and
    transmitting the D2D signal through the determined time-frequency resource region;
    wherein a frequency resource pool of the time-frequency resource region in the subframe includes a first frequency resource region and a second frequency resource region which is discontinuous with the first frequency resource region,
    wherein positions of the first frequency resource region and the second frequency resource region are determined by a start Physical Resource Block (PRB) index of a third frequency resource region including the first frequency resource region and the second frequency resource region, and an end PRB index of the third frequency resource region, and
    wherein sizes of the first frequency resource region and the second frequency resource region are determined by a parameter which is common to the first frequency resource region and the second frequency resource region.

2. The method according to claim 1, wherein the parameter which is common to the first frequency resource region and the second frequency resource region is a number of PRBs.

3. The method according to claim 2,
    wherein a PRB having an index equal to or greater than the start PRB index and less than (start PRB index +number of PRBs) is included in the first frequency resource region, and
    wherein a PRB having an index greater than (end PRB index −number of PRBs) and less than the end PRB index is included in the second frequency region.

4. The method according to claim 2, wherein the start PRB index, the end PRB index, and the number of PRBs are received through higher layer signaling.

5. The method according to claim 1, wherein the D2D signal is a discovery signal.

6. The method according to claim 5, wherein the time-frequency resource region is used during a maximum of 1024 radio frames.

7. The method according to claim 5, wherein a maximum period of a configuration for the time-frequency resource region is 1024 radio frames.

8. The method according to claim 1, wherein the D2D signal is a D2D data signal.

9. The method according to claim 8, wherein D2D transmission mode 2 is configured for the UE.

10. The method according to claim 1, wherein the D2D signal is a D2D control signal.

11. The method according to claim 1, further comprising:
    receiving an indication regarding a resource position of a neighbor cell.

12. The method according to claim 11, wherein the UE assumes that a time-frequency resource region in which a D2D signal of the neighbor cell is to be transmitted is present within a predetermined window based on an indicated timing.

13. A Device-to-Device (D2D) User Equipment (UE) in a wireless communication system, the D2D UE comprising:
    a reception module; and
    a processor,
    wherein the processor determines a time-frequency resource region in which a D2D signal is to be transmitted in a subframe and transmits the D2D signal through the determined time-frequency resource region,
    a frequency resource pool of the time-frequency resource region in the subframe includes a first frequency resource region and a second frequency resource region which is discontinuous with the first frequency resource region,
    wherein positions of the first frequency resource region and the second frequency resource region are determined by a start Physical Resource Block (PRB) index of a third frequency resource region including the first frequency resource region and the second frequency resource region, and an end PRB index of the third frequency resource region, and
    wherein sizes of the first frequency resource region and the second frequency resource region are determined by a parameter which is common to the first frequency resource region and the second frequency resource region.

* * * * *